(12) United States Patent
Ganti

(10) Patent No.: US 8,719,166 B2
(45) Date of Patent: May 6, 2014

(54) ITERATIVE PROCESSING OF TRANSACTION INFORMATION TO DETECT FRAUD

(75) Inventor: Visweswararao Ganti, Plano, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 85 days.

(21) Appl. No.: 12/970,128

(22) Filed: Dec. 16, 2010

(65) Prior Publication Data

US 2012/0158585 A1    Jun. 21, 2012

(51) Int. Cl.
*G06Q 40/00* (2012.01)

(52) U.S. Cl.
USPC .................................. 705/44; 705/75; 705/26

(58) Field of Classification Search
USPC ...................................... 705/26.1, 35, 38, 44
See application file for complete search history.

(56) References Cited

U.S. PATENT DOCUMENTS

2006/0248021 A1*  11/2006  Jain et al. .......................... 705/75
2008/0046334 A1*   2/2008  Lee et al. ......................... 705/26

OTHER PUBLICATIONS

41st Parameter, "Proven Fraud Detection and Intervention", http://the41st.com, Nov. 16, 2010 (print date) 2 pages.
Actimize Inc., "Fraud Prevention Solutions", http://www.actimize.com/index.aspx?page=solutionsfraud, Nov. 16, 2010 (print date), 14 pages.
Arcot, "The Industry's Largest Cloud-based Authentication System", http://arcot.com, Nov.16, 2010 (print date) 5 pages.
Entrust, "Authentication & Fraud Detection", http://www.entrust.com/authentication-fraud-detection/index.htm, Nov. 16, 2010 (print date), 13 pages.
Digital Resolve, "360° Protection Against Online Fraud & Identity Theft", http://www.digitalresolve.com, Nov. 16, 2010 (print date), 2 pages.
Iovation Inc., "The Power of Reputation", http://www.iovation.com, Nov. 16, 2010 (print date), 8 pages.
Guardian Analytics, "Cyber Criminals Are Out There, Waiting to Attack", http://www.guardiananalytics.com, Nov. 16, 2010 (print date), 2 pages.
EMC Corporation, "Securing Virtualization and the Cloud", http://www.rsa.com, Nov. 16, 2010 (print date), 4 pages.
Accertify, Inc., "Fraud prevention is streamlined. End-users are empowered", http://www.accertify.com, Nov. 16, 2010 (print date), 2 pages.

* cited by examiner

*Primary Examiner* — Ojo Oyebisi

(57) ABSTRACT

A fraud management system is configured to store rules for detecting fraud, receive a transaction from a merchant, process the transaction using a first subset of rules to generate a fraud score for the transaction, and output information regarding the fraud score to the merchant to assist the merchant in determining whether to accept, deny, or fulfill the transaction. The fraud management system is further configured to receive, after outputting the information regarding the fraud score to the merchant, additional information relating to the transaction, re-process the transaction using a second subset of rules to generate an update fraud score, and output information regarding the updated fraud score to the merchant to assist the merchant in determining whether to accept, deny, or fulfill the transaction.

18 Claims, 14 Drawing Sheets

ITERATIVE PROCESSING OF TRANSACTION INFORMATION TO DETECT FRAUD

BACKGROUND

Merchants are much more responsible for the cost of fraud than are financial institutions and consumers. Accordingly, merchants are the most motivated victim group to adopt mitigation strategies. The mitigation strategies vary for online merchants as compared to the "brick and mortar" merchants. For example, online merchants typically employ a mixture of purchased and internally developed software solutions and manage significant fraud operations and claims management departments. "Brick and mortar" merchants adopt different mitigation strategies, where in-person interactions with consumers are possible. The techniques used to commit fraud against merchants are ever-changing. Thus, fraud protection, adopted by merchants, needs to be constantly adapting to the ever-changing fraud techniques.

DETAILED DESCRIPTION OF PREFERRED EMBODIMENTS

The following detailed description refers to the accompanying drawings. The same reference numbers in different drawings may identify the same or similar elements.

An implementation, described herein, may detect a fraudulent transaction, from a merchant, by analyzing information associated with multiple transactions from the merchant and/ or one or more other merchants. In one implementation, a particular transaction may be analyzed iteratively. For example, the particular transaction may be analyzed, for fraud, when the particular transaction is received from the merchant, and may be analyzed again, for fraud, one or more later times as additional information, relevant to the particular transaction, is received. The additional information may provide additional context to the fraud analysis and, thereby, improve the determination of whether the particular transaction may be fraudulent.

Figure 1:
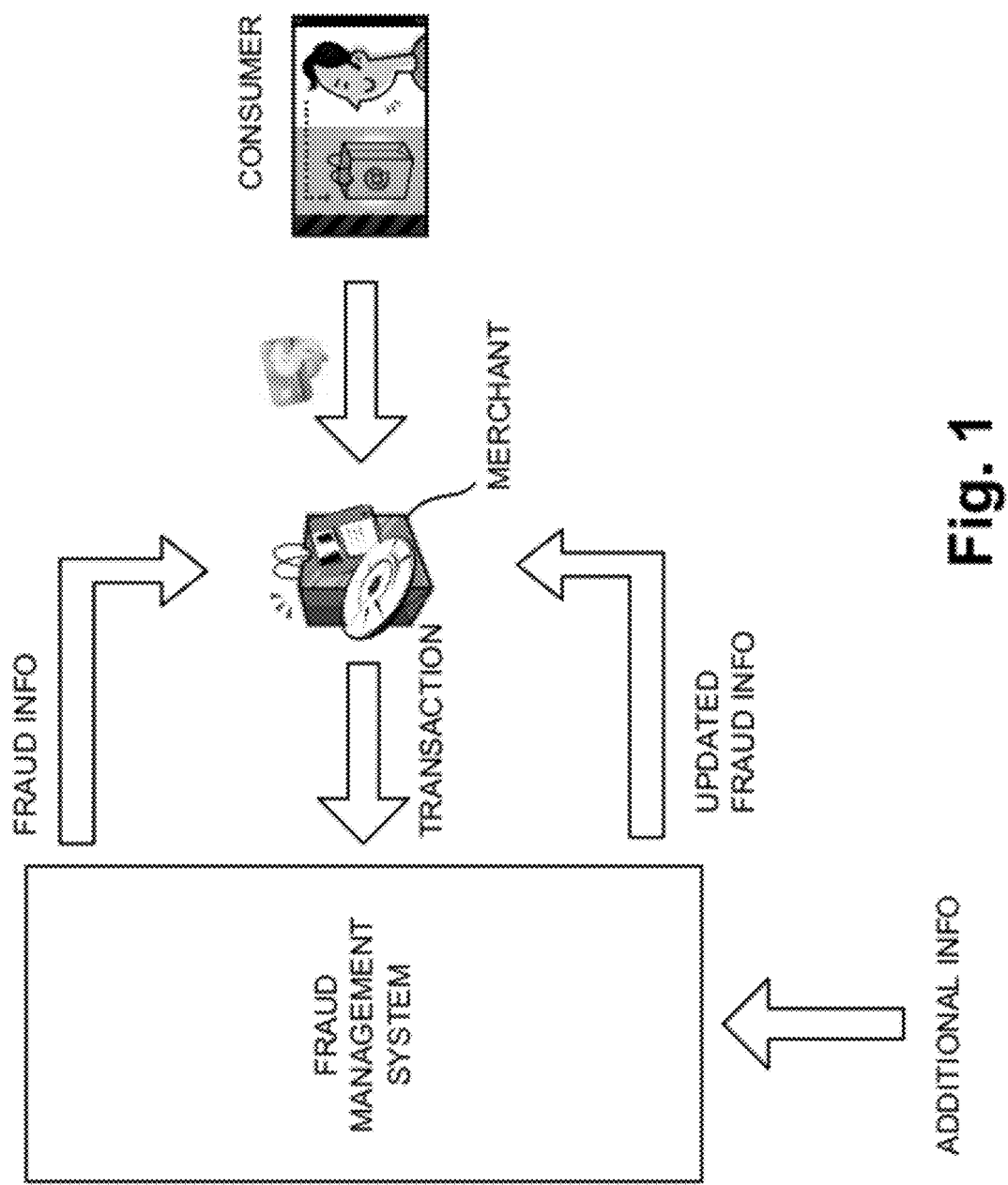
FIG. 1 is a diagram of an overview of an implementation described herein.

FIG. 1 is a diagram of an overview of an implementation described herein. For the example of FIG. 1, assume that a consumer makes an online purchase of electronic goods via a website of a merchant. To complete the online purchase of the electronic goods, the consumer may provide credit or debit card information to the merchant.

The merchant may provide information regarding the transaction to a fraud management system. The term "transaction," as used herein, is intended to be broadly interpreted to include an interaction of a consumer with a merchant. The interaction may involve the payment of money, a promise for a future payment of money, the deposit of money into an account, or the removal of money from an account. The term "money," as used herein, is intended to be broadly interpreted to include anything that can be accepted as payment for goods or services, such as currency, coupons, credit cards, debit cards, gift cards, and funds held in a financial account (e.g., a checking account, a money market account, a savings account, a stock account, a mutual fund account, a paypal account, etc.). In one implementation, the transaction may involve a one time exchange of information, between the merchant and the fraud management system, which may occur at the completion of the interaction between the consumer and the merchant (e.g., when the consumer ends an online session with the merchant). In another implementation, the transaction may involve a series of exchanges of information, between the merchant and the fraud management system, which may occur during and/or after completion of the interaction between the consumer and the merchant.

The fraud management system may process the transaction using selected sets of rules to generate fraud information. The fraud management system may output the fraud information to the merchant to inform the merchant whether the transaction potentially involves fraud. The fraud information may take the form of a fraud score or may take the form of an "accept" alert (meaning that the transaction is not fraudulent) or a "reject" alert (meaning that the transaction is potentially fraudulent). The merchant may then decide whether to permit or deny the transaction, or proceed to fulfill the goods or services secured in the transaction, based on the fraud information. In the description to follow, the phrase "fulfill the transaction," or the like, is intended to refer to fulfilling the goods or services secured in the transaction.

After the fraud management system initially processes the transaction, the fraud management system may receive additional information that may be relevant to the transaction. The additional information may include information regarding another transaction from this consumer, information regarding a transaction from another consumer, information regarding another transaction from the merchant, information regarding a transaction from another merchant that is affiliated with the merchant, information regarding a transaction from another merchant that is unaffiliated with the merchant, information regarding a transaction from another merchant that is associated with the same industry as the merchant, information regarding a transaction from another merchant that is associated with a different industry than the merchant, information regarding user behavior of the consumer on the merchant's website, information regarding user behavior of the consumer on another merchant's website, information regarding a human analyst's analysis of the transaction or other transactions from the consumer, and/or other information that might be useful in determining whether the transaction is fraudulent.

Based on the additional information, the fraud management system may re-process the transaction (one or more times) to generate updated fraud information. The fraud management system may output the updated fraud information to the merchant if the updated fraud information differs from the previously provided fraud information. For example, if the fraud management system previously indicated, to the merchant, that the transaction is not fraudulent and the re-processing of the transaction indicates that the transaction is potentially fraudulent, the fraud management system may notify the merchant that the transaction is potentially fraudulent. As a result, the merchant may be able to take remedial actions to reduce the merchant's loss due to the fraud.

In some scenarios, the fraud management system may detect potential fraud in near real-time (i.e., while the transaction is occurring). In other scenarios, the fraud management system may detect potential fraud after conclusion of the transaction (perhaps minutes, hours, or days later). In either scenario, the fraud management system may reduce revenue loss contributable to fraud. In addition, the fraud management system may help reduce merchant costs in terms of software, hardware, and personnel dedicated to fraud detection and prevention.

Figure 2:
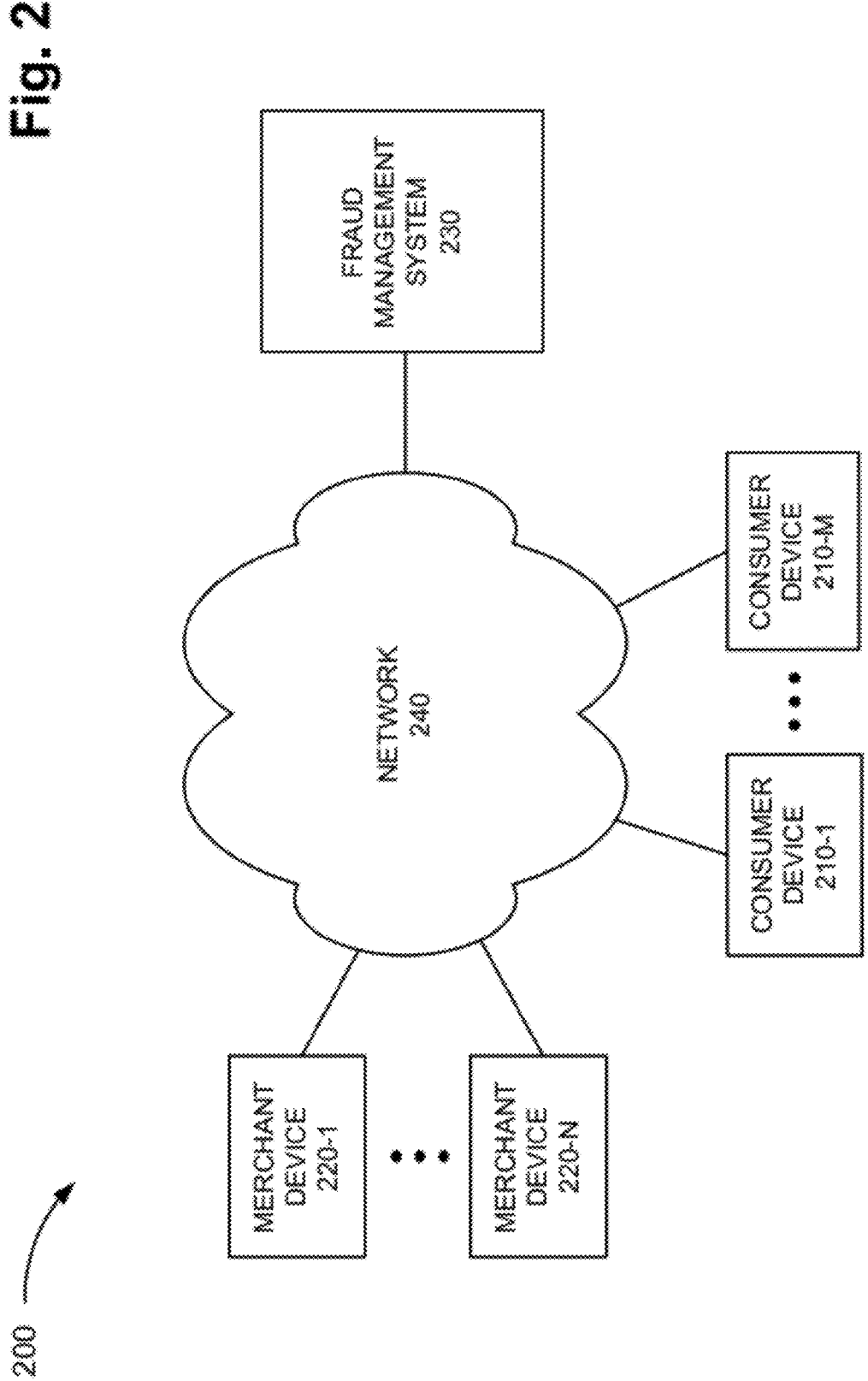
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include consumer devices 210-1, . . . , 210-M (where M≥1) (collectively referred to as "consumer devices 210," and individually as "consumer device 210"), merchant devices 220-1, . . . , 220-N (where N≥1) (collectively referred to as "merchant devices 220," and individually as "merchant device 220"), fraud management system 230, and network 240.

While FIG. 2 shows a particular number and arrangement of devices, in practice, environment 200 may include additional devices, fewer devices, different devices, or differently arranged devices than are shown in FIG. 2. Also, although certain connections are shown in FIG. 2, these connections are simply examples and additional or different connections may exist in practice. Each of the connections may be a wired and/or wireless connection. Further, each consumer device 210 and merchant device 220 may be implemented as multiple, possibly distributed, devices. Alternatively, a consumer device 210 and a merchant device 220 may be implemented within a single device.

Consumer device 210 may include any device capable of interacting with a merchant device 220 to perform a transaction. For example, consumer device 210 may correspond to a communication device (e.g., a mobile phone, a smartphone, a personal digital assistant (PDA), or a wireline telephone), a computer device (e.g., a laptop computer, a tablet computer, or a personal computer), a gaming device, a set top box, or another type of communication or computation device. As described herein, a user, of a consumer device 210, may use consumer device 210 to perform a transaction with regard to a merchant device 220.

Merchant device 220 may include a device, or a collection of devices, capable of interacting with a consumer device 210 to perform a transaction. For example, merchant device 220 may correspond to a computer device (e.g., a server, a laptop computer, a tablet computer, or a personal computer). Additionally, or alternatively, merchant device 220 may include a communication device (e.g., a mobile phone, a smartphone, a PDA, or a wireline telephone) or another type of communication or computation device. As described herein, merchant device 220 may interact with a consumer device 210 to perform a transaction and may interact with fraud management system 230 to determine whether that transaction is potentially fraudulent.

Fraud management system 230 may include a device, or a collection of devices, that performs fraud analysis. Fraud management system 230 may receive transaction information from merchant devices 220, perform fraud analysis with regard to the transaction information, and provide, to merchant devices 220, information regarding the results of the fraud analysis.

Network 240 may include any type of network or a combination of networks. For example, network 240 may include a local area network (LAN), a wide area network (WAN) (e.g., the Internet), a metropolitan area network (MAN), an ad hoc network, a telephone network (e.g., a Public Switched Telephone Network (PSTN), a cellular network, or a voice-over-IP (VoIP) network), an optical network (e.g., a FiOS network), or a combination of networks. In one implementation, network 240 may support secure communications between merchants 220 and fraud management system 230. These secure communications may include encrypted communications, communications via a private network (e.g., a virtual private network (VPN) or a private IP VPN (PIP VPN)), other forms of secure communications, or a combination of secure types of communications.

Figure 3:
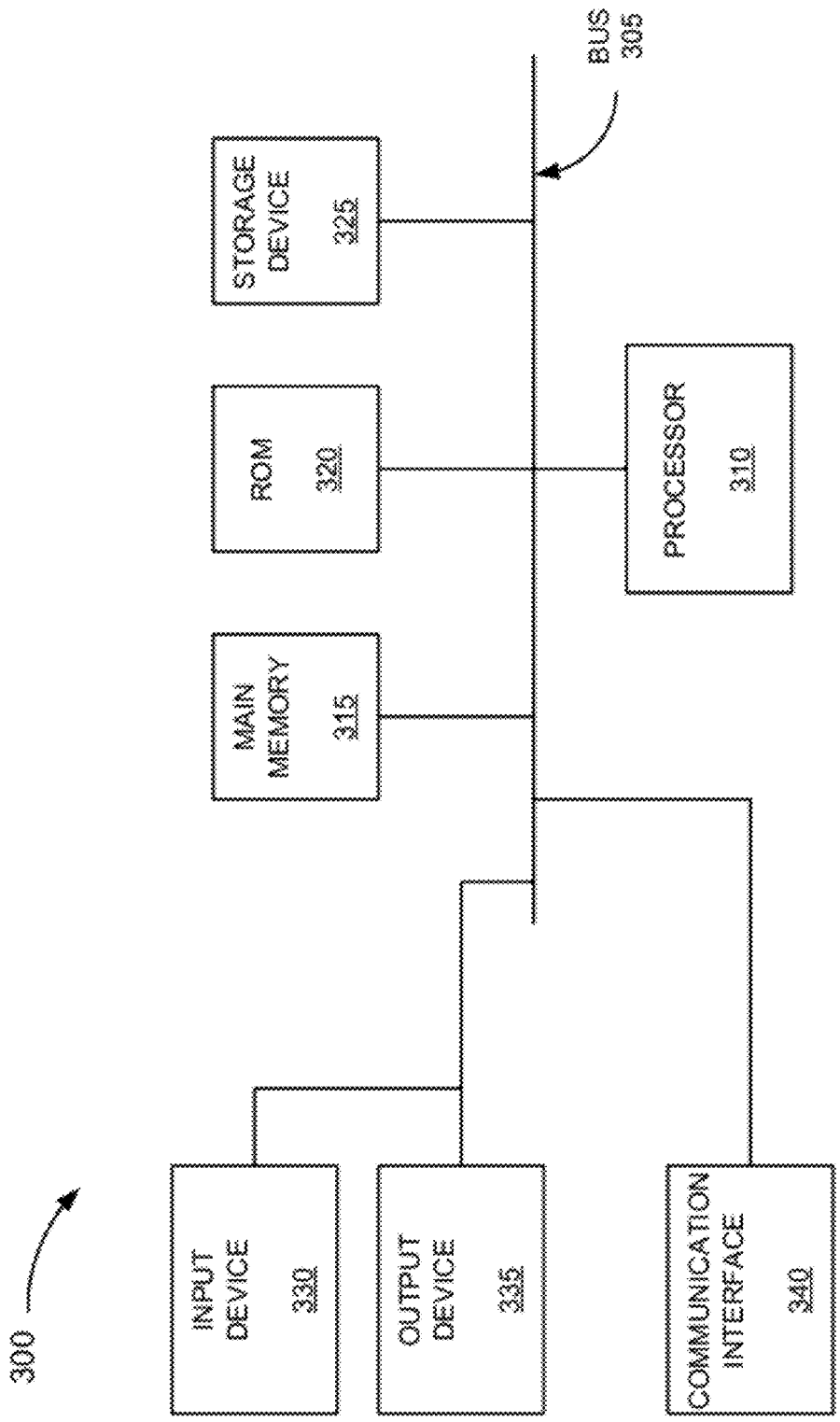
FIG. 3 is a diagram of example components of a device that may be used within the environment of FIG. 2.

FIG. 3 is a diagram of example components of a device 300. Device 300 may correspond to consumer device 210, merchant device 220, or fraud management system 230. Each of consumer device 210, merchant device 220, and fraud management system 230 may include one or more devices 300.

As shown in FIG. 3, device 300 may include a bus 305, a processor 310, a main memory 315, a read only memory (ROM) 320, a storage device 325, an input device 330, an output device 335, and a communication interface 340. In another implementation, device 300 may include additional components, fewer components, different components, or differently arranged components.

Bus 305 may include a path that permits communication among the components of device 300. Processor 310 may include one or more processors, one or more microprocessors, one or more application specific integrated circuits (ASICs), one or more field programmable gate arrays (FPGAs), or one or more other types of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks (e.g., network 240). In one implementation, communication interface 340 may include a wireless interface and/or a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
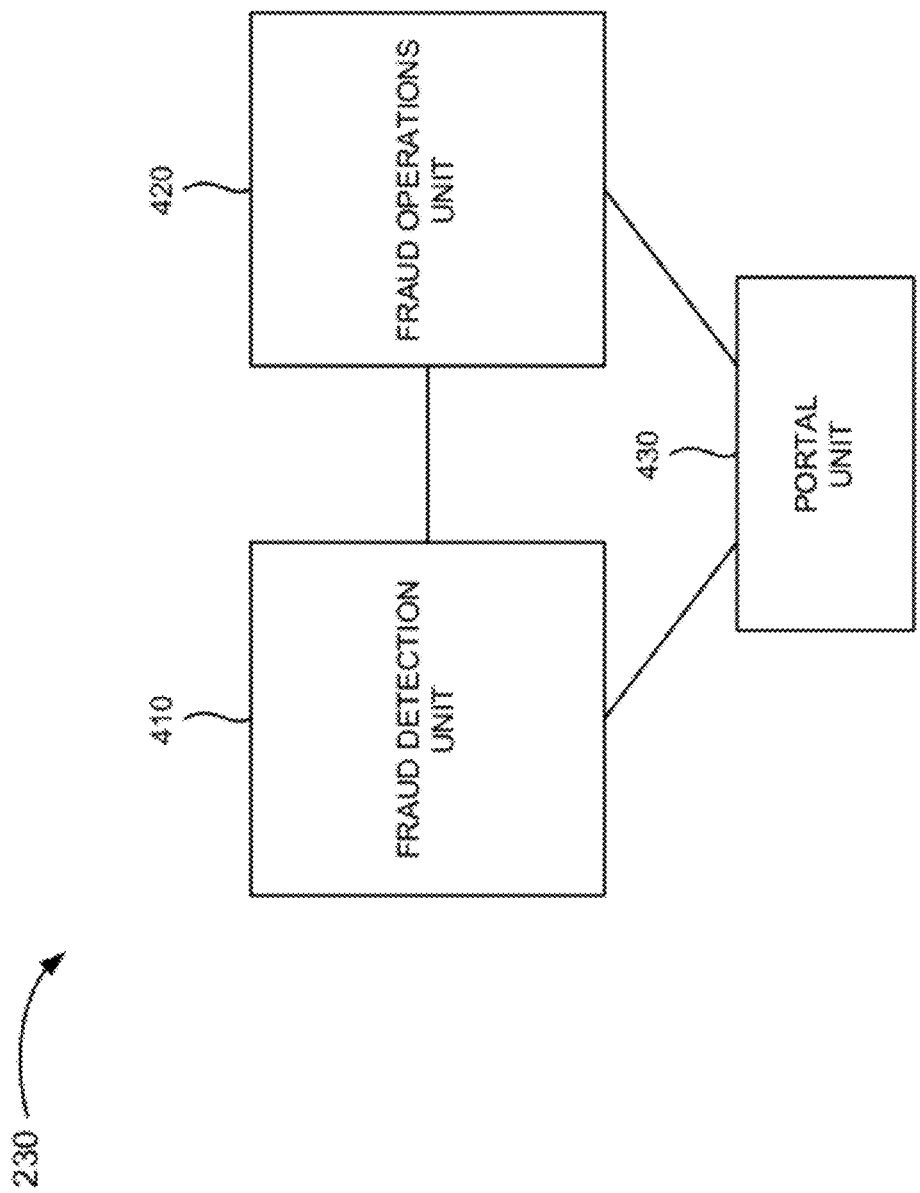
FIG. 4 is a diagram of example functional units of the fraud management system of FIG. 2.

FIG. 4 is a diagram of example functional units of fraud management system 230. In one implementation, the functions described in connection with FIG. 4 may be performed by one or more components of device 300 (FIG. 3) or one or more devices 300, unless described as being performed by a human.

As shown in FIG. 4, fraud management system 230 may include fraud detection unit 410, fraud operations unit 420, and portal unit 430. In another implementation, fraud management system 230 may include fewer functional units, additional functional units, different functional units, or differently arranged functional units. Fraud detection unit 410, fraud operations unit 420, and portal unit 430 will be described generally with regard to FIG. 4 and will be described in more detail with regard to FIGS. 5-10.

Generally, fraud detection unit 410 may receive information regarding transactions from merchant devices 220 and analyze the transactions to determine whether the transactions are potentially fraudulent. In one implementation, fraud detection unit 410 may classify a transaction as: "safe," "unsafe," or "for review." A "safe" transaction may include a transaction with a fraud score that is less than a first threshold (e.g., less than 5, less than 10, less than 20, etc. within a range of fraud scores of 0 to 100, where a fraud score of 0 may represent a 0% probability that the transaction is fraudulent and a fraud score of 100 may represent a 100% probability that the transaction is fraudulent). An "unsafe" transaction may include a transaction with a fraud score that is greater than a second threshold (e.g., greater than 90, greater than 80, greater than 95, etc. within the range of fraud scores of 0 to 100) (where the second threshold is greater than the first threshold). A "for review" transaction may include a transaction with a fraud score that is greater than a third threshold (e.g., greater than 50, greater than 40, greater than 60, etc. within the range of fraud scores of 0 to 100) and not greater than the second threshold (where the third threshold is greater than the first threshold and less than the second threshold). In one implementation, the first, second, and third thresholds and the range of potential fraud scores may be set by an operator of fraud management system 230. In another implementation, the first, second, and/or third thresholds and/or the range of potential fraud scores may be set by a merchant. In this case, the thresholds and/or range may vary from merchant-to-merchant. The fraud score may represent a probability that a transaction is fraudulent.

If fraud detection unit 410 determines that a transaction is a "safe" transaction, fraud detection unit 410 may notify a merchant device 220 that merchant device 220 may safely approve, or alternatively fulfill, the transaction. If fraud detection unit 410 determines that a transaction is an "unsafe" transaction, fraud detection unit 410 may notify a merchant device 220 to take measures to minimize the risk of fraud (e.g., deny the transaction, request additional information from a consumer device 210, require interaction with a human operator, refuse to fulfill the transaction, etc.). Alternatively, or additionally, fraud detection unit 410 may provide information regarding the unsafe transaction to fraud operations unit 420 for additional processing of the transaction. If fraud detection unit 410 determines that a transaction is a "for review" transaction, fraud detection unit 410 may provide information regarding the transaction to fraud operations unit 420 for additional processing of the transaction.

Generally, fraud operations unit 420 may receive information regarding certain transactions and may analyze these transactions to determine whether a determination can be made whether the transactions are fraudulent. In one implementation, human analyzers may use various research tools to investigate transactions and determine whether the transactions are fraudulent.

Generally, portal unit 430 may generate reports and permit merchants to request and gain access to reports relating to transactions associated with the merchants. Portal unit 430 may also function like an access port via which a merchant device 220 may gain access to information from fraud detection unit 410 and/or information from fraud operations unit 420, and/or otherwise interact with fraud detection unit 410 and/or fraud operations unit 420.

Figure 5:
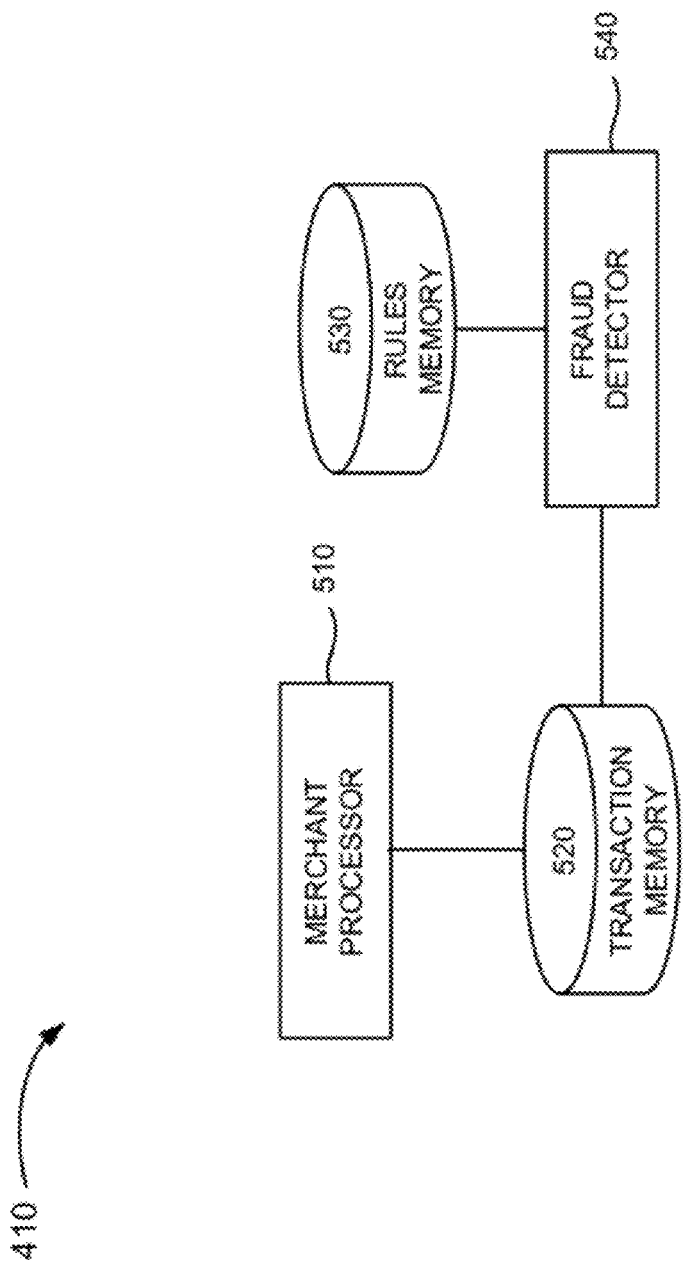
FIG. 5 is a diagram of example functional components of the fraud detection unit of FIG. 4.

FIG. 5 is a diagram of example functional components of fraud detection unit 410. In one implementation, the functions described in connection with FIG. 5 may be performed by one or more components of device 300 (FIG. 3) or one or more devices 300. As shown in FIG. 5, fraud detection unit 410 may include a merchant processor component 510, a transaction memory 520, a rules memory 530, and a fraud detector component 540. In another implementation, fraud detection unit 410 may include fewer functional components, additional functional components, different functional components, or differently arranged functional components.

Merchant processor component 510 may include a device, or a collection of devices, that may interact with merchants to assist the merchants in using fraud management system 230 and that may periodically collect user behavior data concerning activities of consumers in relation to websites of the merchants. For example, merchant processor component 510 may exchange encryption information, such as public/private keys or VPN information, with a merchant device 220 to permit secure future communications between fraud detection system 230 and merchant device 220.

Merchant processor component 510 may receive, from the merchant or merchant device 220, information that might be useful in detecting a fraudulent transaction. For example, merchant processor component 510 may receive a black list (e.g., a list of consumers or consumer devices 210 that are known to be associated with fraudulent activity) and/or a white list (e.g., a list of consumers or consumer devices 210 that are known to be particularly trustworthy). Additionally, or alternatively, merchant processor component 510 may receive historical records of transactions from the merchant or merchant device 220. These historical records may include information regarding transactions that were processed by a system other than fraud management system 230. Additionally, or alternatively, merchant processor component 510 may receive a set of policies from the merchant or merchant device 220. The policies may indicate thresholds for determining safe transactions, unsafe transactions, and for review transactions, may indicate a range of possible fraud scores (e.g., range of 0 to 100, range of 0 to 1000, etc.), or may indicate other business practices of the merchant. Additionally, or alternatively, merchant processor component 510 may receive a set of rules that are particular to the merchant.

Merchant processor 510 may also receive user behavior data from a merchant or merchant device 220. User behavior data may include information regarding a consumer's activity with regard to a merchant's website, such as the pages that the consumer accessed, the searches that the consumer performed, the selections that the consumer made, the purchases that the consumer has made, etc. The user behavior data may correspond to a single session, or multiple sessions, involving the consumer and the merchant. In one implementation, a merchant or merchant device 220 may send user behavior data to merchant processor 510 on-the-fly (i.e., as the activity is happening). Additionally, or alternatively, a merchant or merchant device 220 may send user behavior data to merchant processor 510 at some point after the activity has occurred. In either situation, the user behavior data may be used to determine whether a transaction, associated with this consumer (or another consumer), is fraudulent.

Transaction memory 520 may include one or more memory devices to store information regarding present and/or past transactions, and/or user behavior data. Present transactions may include transactions currently being processed by fraud detector component 540, and past transactions may include transactions previously processed by fraud detector component 540. In one implementation, transaction memory 520 may store data in the form of a database, such as a relational database or an object-oriented database. In another implementation, transaction memory 520 may store data in a non-database manner, such as tables, linked lists, or another arrangement of data.

Transaction memory 520 may store various information for any particular transaction. For example, transaction memory 520 might store: information identifying a consumer or a consumer device 210 (e.g., a consumer device ID, an IP address associated with the consumer device, a telephone number associated with the consumer device, a username associated with the consumer, a consumer ID, etc.); information identifying a merchant or a merchant device 220 (e.g., a merchant ID, merchant name, merchant device ID, etc.); information identifying an industry with which the merchant is associated (e.g., retail, medical, travel, financial, etc.); a name, telephone number, and address associated with the consumer; information regarding consumer device 210 (e.g., an IP address associated with the consumer device, a type/version of browser used by the consumer device, cookie information associated with the consumer device, a type/version of an operating system used by the consumer device, etc.); a dollar amount of the transaction; line items of the transaction (e.g., identification of each good/service purchased, each leg of an airplane flight booked, etc.); information regarding a form of payment received from the consumer (e.g., credit card information, debit card information, checking account information, paypal account information, etc.); a day and/or time that the transaction occurred (e.g., 13:15 on Nov. 5, 2010); a geographic location associated with the transaction or the consumer (e.g., a destination location associated with a form of travel, an origination location associated with a form of travel, a location of a hotel for which a room was reserved, a location of a residence of the consumer, etc.), and/or other types of information associated with the transaction, the merchant, the merchant device 220, the consumer, or the consumer device 210, and/or a past transaction associated with the merchant, the merchant device 220, the consumer, or the consumer device 210.

Transaction memory 520 may also store other information that might be useful in detecting a fraudulent transaction. For example, transaction memory 520 may store black lists and/or white lists. The black/white lists may be particular to a merchant or an industry or may be applicable across merchants or industries. The black/white lists may be received from merchants or may be generated by fraud management system 230.

Transaction memory 520 may also store historical records of transactions from a merchant. These historical records may include transactions that were processed by a system other than fraud management system 230. The historical records may include information similar to the information identified above and may also include information regarding transactions that the merchant had identified as fraudulent.

Rules memory 530 may include one or more memory devices to store information regarding rules that may be applicable to transactions. In one implementation, rules memory 530 may store rules in one or more libraries. A "library" may be a block of memory locations (contiguous or non-contiguous memory locations) that stores a set of related rules. In another implementation, rules memory 530 may store rules in another manner (e.g., as database records, tables, linked lists, etc.).

The rules may include general rules, merchant-specific rules, industry-specific rules, consumer-specific rules, transaction attribute specific rules, single transaction rules, multi-transaction rules, heuristic rules, pattern recognition rules, and/or other types of rules. Some rules may be applicable to all transactions (e.g., general rules may be applicable to all transactions), while other rules may be applicable to a specific set of transactions (e.g., merchant-specific rules may be applicable to transactions associated with a particular merchant). Rules may be used to process a single transaction (meaning that the transaction may be analyzed for fraud without considering information from another transaction) or may be used to process multiple transactions (meaning that the transaction may be analyzed for fraud by considering information from another transaction). Rules may also be applicable to multiple, unaffiliated merchants (e.g., merchants having no business relationships) or multiple, unrelated consumers (e.g., consumers having no familial or other relationship).

Figure 6:
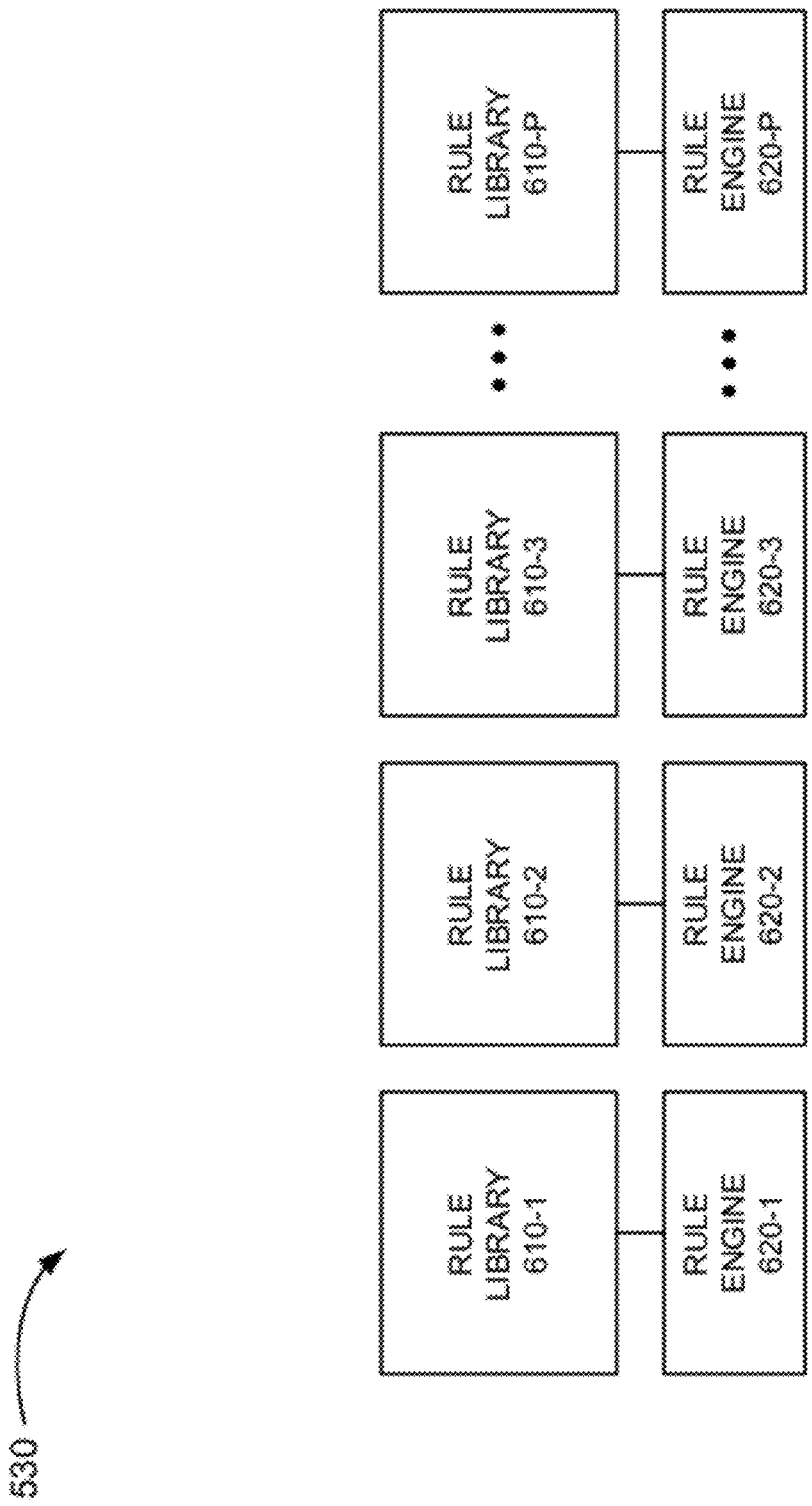
FIG. 6 is a diagram of example libraries that may be present within the rules memory of FIG. 5.

FIG. 6 is a diagram of example libraries that may be present within rules memory 530. As shown in FIG. 6, rules memory 530 may include rule libraries 610-1, 610-2, 610-3, ... 610-P (P≥1) (collectively referred to as "libraries 610," and individually as "library 610") and rule engines 620-1, 620-2, 620-3, ... 620-P (collectively referred to as "rule engines 620," and individually as "rule engine 620"). While FIG. 6 illustrates that rules memory 530 includes a set of rule libraries 610 and a corresponding set of rule engines 620, rules memory 530 may include fewer, additional, or different components in another implementation.

Each rule library 610 may store a set of related rules. For example, a rule library 610 may store general rules that are applicable to all transactions. Additionally, or alternatively, a rule library 610 may store rules applicable to a single transaction (meaning that the transaction may be analyzed for fraud without considering information from another transaction). Additionally, or alternatively, a rule library 610 may store rules applicable to multiple transactions (meaning that the transaction may be analyzed for fraud by considering information from another transaction (whether from the same merchant or a different merchant, whether associated with the same consumer or a different consumer)).

Additionally, or alternatively, a rule library 610 may store merchant-specific rules. Merchant-specific rules may include rules that are applicable to transactions of a particular merchant, and not applicable to transactions of other merchants. Additionally, or alternatively, a rule library 610 may store industry-specific rules. Industry-specific rules may include rules that are applicable to transactions associated with a particular industry of merchants (e.g., financial, medical, retail, travel, etc.), and not applicable to transactions associated with other industries. Additionally, or alternatively, a rule library 610 may store consumer-specific rules. Consumer-specific rules may include rules that are applicable to transactions of a particular consumer or a particular set of consumers (e.g., all consumers in the consumer's family, all consumers located at a particular geographic location, all consumers located within a particular geographic region, all consumers using a particular type of browser or operating system, etc.), and not applicable to transactions of other consumers or sets of consumers.

Additionally, or alternatively, a rule library 610 may store location-specific rules. Location-specific rules may include rules that are applicable to transactions associated with a particular geographic area (e.g., an origination location associated with a travel itinerary, a destination location associated with a travel itinerary, a location from which a transaction originated, etc.), and not applicable to transactions associated with other geographic areas. Additionally, or alternatively, a rule library 610 may store rules associated with a particular transaction attribute, such as a dollar amount or range, a name of a traveler, a telephone number, etc.

The rules in rule libraries 610 may include human-generated rules and/or automatically-generated rules. The automatically-generated rules may include heuristic rules and/or pattern recognition rules. Heuristic rules may include rules that have been generated by using statistical analysis, or the like, that involves analyzing a group of attributes (e.g., a pair of attributes or a tuple of attributes) of transactions, and learning rules associated with combinations of attributes that are indicative of fraudulent transactions. Pattern recognition rules may include rules that have been generated using machine learning, artificial intelligence, neural networks, decision trees, or the like, that analyzes patterns appearing in a set of training data, which includes information regarding transactions that have been identified as fraudulent and information regarding transactions that have been identified as non-fraudulent, and generates rules indicative of patterns associated with fraudulent transactions.

In other implementations, rule libraries 610 may store other types of rules, other combinations of rules, or differently-generated rules. Because fraud techniques are constantly changing, the rules, in rule libraries 610, may be regularly updated (either by manual or automated interaction) by modifying existing rules, adding new rules, and/or removing antiquated rules.

Each rule engine 620 may correspond to a corresponding rule library 610. A rule engine 620 may receive a transaction from fraud detector component 540, coordinate the execution of the rules by the corresponding rule library 610, and return the results (in the form of zero or more alarms) to fraud detector component 540. In one implementation, rule engine 620 may cause a transaction to be processed by a set of rules within the corresponding rule library 610 in parallel. In other words, the transaction may be concurrently processed by multiple, different rules in a rule library 610 (rather than serially processed).

Returning to FIG. 5, fraud detector component 540 may include a device, or a collection of devices, that performs automatic fraud detection on transactions. Fraud detector component 540 may receive a transaction from a particular merchant device 220 and select particular libraries 610 and particular rules within the selected libraries 610 applicable to the transaction. Fraud detector component 540 may then provide the transaction for processing by the selected rules in the selected libraries 610 in parallel. The output of the processing, by the selected libraries 610, may include zero or more alarms. An "alarm," as used herein, is intended to be broadly interpreted as a triggering of a rule in a library 610. A rule is triggered when the transaction satisfies the rule. For example, assume that a rule indicates a situation where a consumer reserves a hotel room in the same geographic area in which the consumer lives. A transaction would trigger (or satisfy) the rule if the transaction involved a consumer making a reservation for a hotel room in the town where the consumer lives.

Fraud detector component 540 may sort and group the alarms and analyze the groups to generate a fraud score. The fraud score may reflect the probability that the transaction is fraudulent. Fraud detector component 540 may send the fraud score, or an alert generated based on the fraud score, to a merchant device 220. The alert may simply indicate that merchant device 220 should accept, deny, or fulfill the transaction. In one implementation, the processing by fraud detector component 540 from the time that fraud detector component 540 receives the transaction to the time that fraud detector component 540 sends the alert may be within a relatively short time period, such as, for example, within thirty seconds, sixty seconds, or ten seconds. In another implementation, the processing by fraud detector component 550 from the time that fraud detector component 550 receives the transaction to the time that fraud detector component 550 sends the alert may be within a relatively longer time period, such as, for example, within minutes, hours or days.

Figure 7:
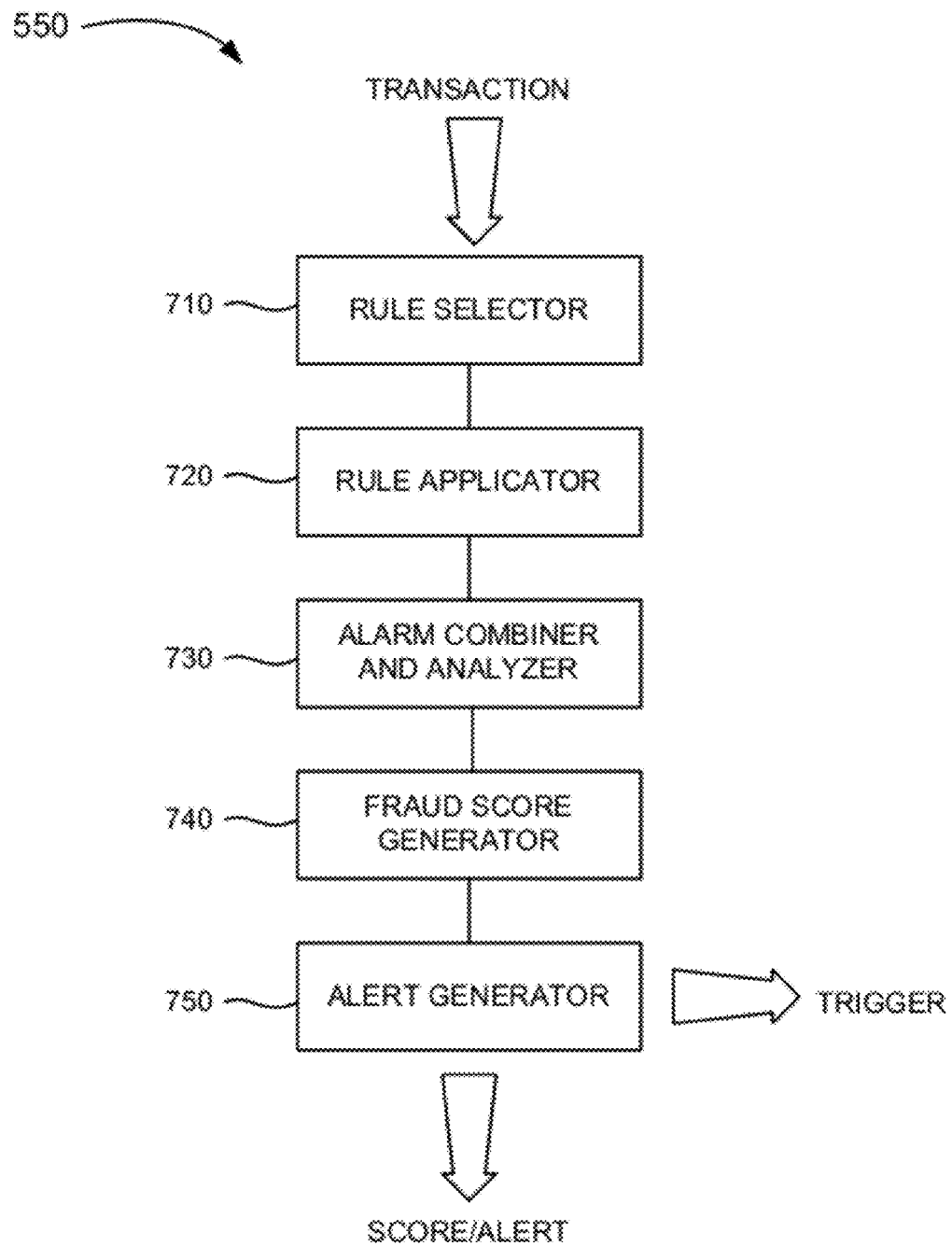
FIG. 7 is a diagram of example functional components of the fraud detector of FIG. 5.

FIG. 7 is a diagram of example functional components of fraud detector component 540. In one implementation, the functions described in connection with FIG. 7 may be performed by one or more components of device 300 (FIG. 3) or one or more devices 300. As shown in FIG. 7, fraud detector component 540 may include a rule selector component 710, a rule applicator component 720, an alarm combiner and analyzer component 730, a fraud score generator component 740, and an alert generator component 750. In another implementation, fraud detector component 540 may include fewer functional components, additional functional components, different functional components, or differently arranged functional components.

Rule selector component 710 may receive a transaction from a merchant device 220. In one implementation, the transaction may include various information, such as information identifying a consumer (e.g., name, address, telephone number, etc.); a total dollar amount of the transaction; a name of a traveler (in the case of a travel transaction); line items of the transaction (e.g., information identifying a good or service purchased or rented, origination, destination, and intermediate stops of travel, etc.); information identifying a merchant (e.g., merchant name or merchant identifier); information regarding a form of payment received from the consumer (e.g., credit card information, debit card information, checking account information, paypal account information, etc.); and information identifying a day and/or time that the transaction occurred (e.g., 13:15 on Nov. 5, 2010).

Additionally, or alternatively, rule selector component 710 may receive other information (called "meta information") from the merchant in connection with the transaction. For example, the meta information may include information identifying a consumer device 210 (e.g., a consumer device ID, an IP address associated with the consumer device, a telephone number associated with the consumer device, etc.); other information regarding consumer device 210 (e.g., an IP address associated with the consumer device, a type/version of browser used by the consumer device, cookie information associated with the consumer device, a type/version of an operating system used by the consumer device, etc.); user behavior data associated with the consumer; and/or other types of information associated with the transaction, the merchant, the merchant device 220, the consumer, or the consumer device 210.

Additionally, or alternatively, rule selector component 710 may receive or obtain other information (called "third party information") regarding the transaction, the merchant, the merchant device 220, the consumer, or the consumer device 210. For example, the other information may include a geographic identifier (e.g., zip code or area code) that may correspond to the IP address associated with consumer device 210. The other information may also, or alternatively, include information identifying an industry with which the merchant is associated (e.g., retail, medical, travel, financial, etc.). Rule selector component 710 may obtain the third party information from a memory or may use research tools, such an IP address-to-geographic location identifier look up tool or a merchant name-to-industry look up tool.

Additionally, or alternatively, rule selector component 710 may receive or obtain historical information regarding the merchant, the merchant device 220, the consumer, the consumer device 210, or information included in the transaction. In one implementation, rule selector component 710 may obtain the historical information from transaction memory 520 (FIG. 5).

The transaction information, the meta information, the third party information, and/or the historical information may be individually referred to as a "transaction attribute" or an "attribute of the transaction," and collectively referred to as "transaction attributes" or "attributes of the transaction."

Rule selector component 710 may generate a profile for the transaction based on the transaction attributes. Based on the transaction profile and perhaps relevant information in a white or black list (i.e., information, relevant to the transaction, that is present in a white or black list), rule selector component 710 may select a set of libraries 610 within rules memory 530 and/or may select a set of rules within one or more of the selected libraries 610. For example, rule selector component 710 may select libraries 610, corresponding to general rules, single transaction rules, multi-transaction rules, merchant-specific rules, industry-specific rules, etc., for the transaction.

Rule applicator component 720 may cause the transaction to be processed using rules of the selected libraries 610. For example, rule applicator component 720 may provide information regarding the transaction to rule engines 620 corresponding to the selected libraries 610. Each rule engine 620 may process the transaction in parallel and may process the transaction using all or a subset of the rules in the corresponding library 610. The transaction may be concurrently processed by different sets of rules (of the selected libraries 610 and/or within each of the selected libraries 610). The output, of each of the selected libraries 610, may include zero or more alarms. As explained above, an alarm may be generated when a particular rule is triggered (or satisfied).

Alarm combiner and analyzer component 730 may aggregate and correlate the alarms. For example, alarm combiner and analyzer component 730 may analyze attributes of the transaction(s) with which the alarms are associated (e.g., attributes relating to a form of payment, an IP address, a travel destination, etc.). Alarm combiner and analyzer component 730 may sort the alarms, along with alarms of other transactions (past or present), into groups (called "cases") based on values of one or more of the attributes of the transactions associated with the alarms (e.g., credit card numbers, IP addresses, geographic locations, consumer names, etc.). The transactions, included in a case, may involve one merchant or multiple, unaffiliated merchants and/or one consumer or multiple, unrelated consumers.

Alarm combiner and analyzer component 730 may separate alarms (for all transactions, transactions sharing a common transaction attribute, or a set of transactions within a particular window of time) into one or more cases based on transaction attributes. For example, alarm combiner and analyzer component 730 may place alarms associated with a particular credit card number into a first case, alarms associated with another particular credit card number into a second case, alarms associated with a particular IP address into a third case, alarms associated with a consumer or consumer device 210 into a fourth case, alarms associated with a particular merchant into a fifth case, alarms associated with a particular geographic location into a sixth case, etc. A particular alarm may be included in multiple cases.

Figure 8:
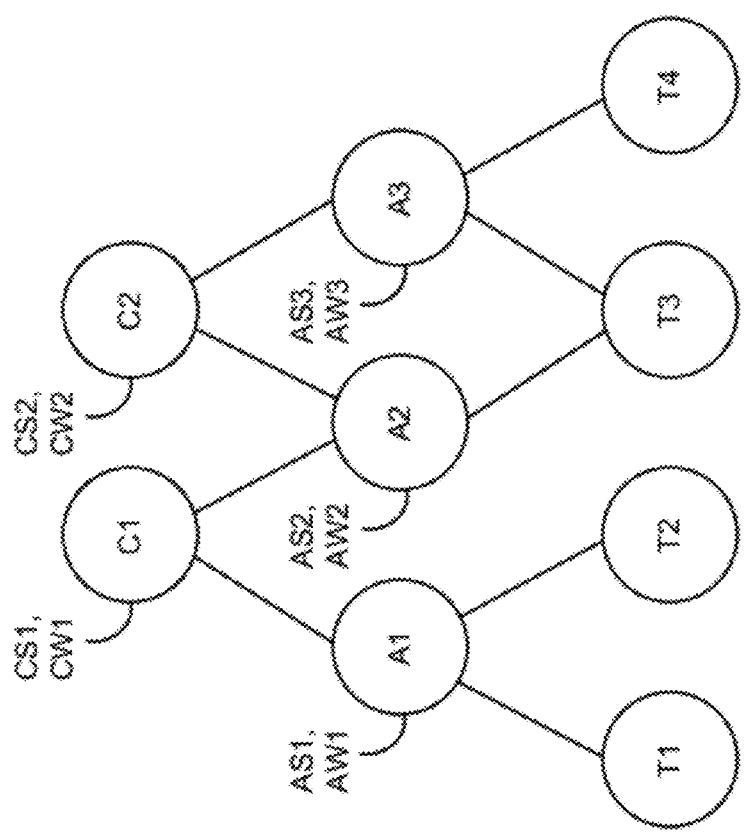
FIG. 8 is a diagram of example cases into which alarms may be placed by the alarm combiner and analyzer component of FIG. 7.

FIG. 8 is a diagram of example cases into which alarms may be placed by alarm combiner and analyzer component 730. As shown in FIG. 8, assume that fraud detector component 540 receives four transactions T1-T4. By processing each of transactions T1-T4 using rules in select libraries 610, zero or more alarms may be generated. As shown in FIG. 8, assume that three alarms A1-A3 are generated. An alarm may be an aggregation of one or more transactions (e.g., alarm A1 is the aggregation of transactions T1 and T2; alarm A2 is the aggregation of transaction T3; and alarm A3 is the aggregation of transactions T3 and T4) that share a common attribute. The alarms may be correlated into cases. As shown in FIG. 8, assume that two cases C1 and C2 are formed. A case is a correlation of one or more alarms (e.g., case C1 is the correlation of alarms A1 and A2; and case C2 is the correlation of alarms A2 and A3) that share a common attribute.

An individual alarm may not be sufficient evidence to determine that a transaction is fraudulent. When the alarm is correlated with other alarms in a case, then a clearer picture of whether the transaction is fraudulent may be obtained. Further, when multiple cases involving different attributes of the same transaction are analyzed, then a decision may be made whether a transaction is potentially fraudulent.

Returning to FIG. 7, fraud score generator component 740 may generate a fraud score. Fraud score generator component 740 may generate a fraud score from information associated with one or more cases (each of which may include one or more transactions and one or more alarms). In one implementation, fraud score generator component 740 may generate an alarm score for each generated alarm. For example, each of the transaction attributes and/or each of the rules may have a respective associated weight value. Thus, when a particular transaction attribute causes a rule to trigger, the generated alarm may have a particular score based on the weight value of the particular transaction attribute and/or the weight value of the rule. When a rule involves multiple transactions, the generated alarm may have a particular score that is based on a combination of the weight values of the particular transaction attributes.

In one implementation, fraud score generator component 740 may generate a case score for a case by combining the alarm scores in some manner. For example, fraud score generator component 740 may generate a case score (CS) by using a log-based Naïve Bayesian algorithm, such as:

$$CS = \frac{\sum_i \frac{AS_i \times AW_i}{AM_i}}{\sum_i AW_i} \times 1000,$$

where CS may refer to the score for a case, $AS_i$ may refer to an alarm score for a given value within an alarm i, $AW_i$ may refer to a relative weight given to alarm i, and $AM_i$ may refer to a maximum score value for alarm i. The following equation may be used to calculate $AS_i$ when the score for the alarm involves a list (e.g., more than one alarm in the case):

$$AS_i = 1 - (1-s_i) \times (1-s_2) \times (1-s_n).$$

Alternatively, fraud score generator component 740 may generate a case score using an equation, such as:

$$CS = \sum_{k=1}^{m} AS_k, \text{ or}$$

$$CS = \sum_{k=1}^{m} AS_k \times AW_k$$

(as shown in FIG. 8, alarm A1 has an alarm score AS1 and a weight value AW1, alarm A2 has an alarm score AS2 and a weight value AW2, and alarm A3 has an alarm score AS3 and a weight value AW3).

Fraud score generator component 740 may generate a fraud score for a transaction by combining the case scores in some manner. For example, fraud score generator component 740 may generate the fraud score (FS) using an equation, such as:

$$FS = \sum_{k=1}^{n} CS_k.$$

In another implementation, each case may have an associated weight value (as shown in FIG. 8, case C1 has a case score CS1 and a weight value CW1, and case C2 has a case score CS2 and a weight value CW2). In this situation, fraud score generator component 740 may generate the fraud score using an equation, such as:

$$FS = \sum_{k=1}^{n} CS_k \times CW_k,$$

where CW may refer to a weight value for a case.

Alert generator component 750 may generate an alert and/or a trigger based, for example, on the fraud score. In one implementation, alert generator component 750 may classify the transaction, based on the fraud score, into: safe, unsafe, or for review. As described above, fraud detection unit 410 may store policies for a particular merchant that indicate, among other things, the thresholds that are to be used to classify a transaction as safe, unsafe, or for review. When the transaction is classified as safe or unsafe, alert generator component 750 may generate and send the fraud score and/or an alert (e.g., safe/unsafe or accept/deny) to the merchant so that the merchant can make an intelligent decision as to whether to accept, deny, or fulfill the transaction. When the transaction is classified as for review, alert generator component 750 may generate and send a trigger to fraud operations unit 420 so that fraud operations unit 420 may perform further analysis regarding a transaction or a set of transactions associated with a case.

As described briefly above and in more detail below, fraud detector component 540 may analyze a particular transaction at multiple, different times. For example, fraud detector component 540 may initially process the transaction to generate a fraud score and/or an alert, as described above. As additional information is obtained relating to one or more of the transaction attributes, fraud detector component 540 may subsequently process the transaction one or more additional times to update the fraud score and/or the alert.

Figure 9:
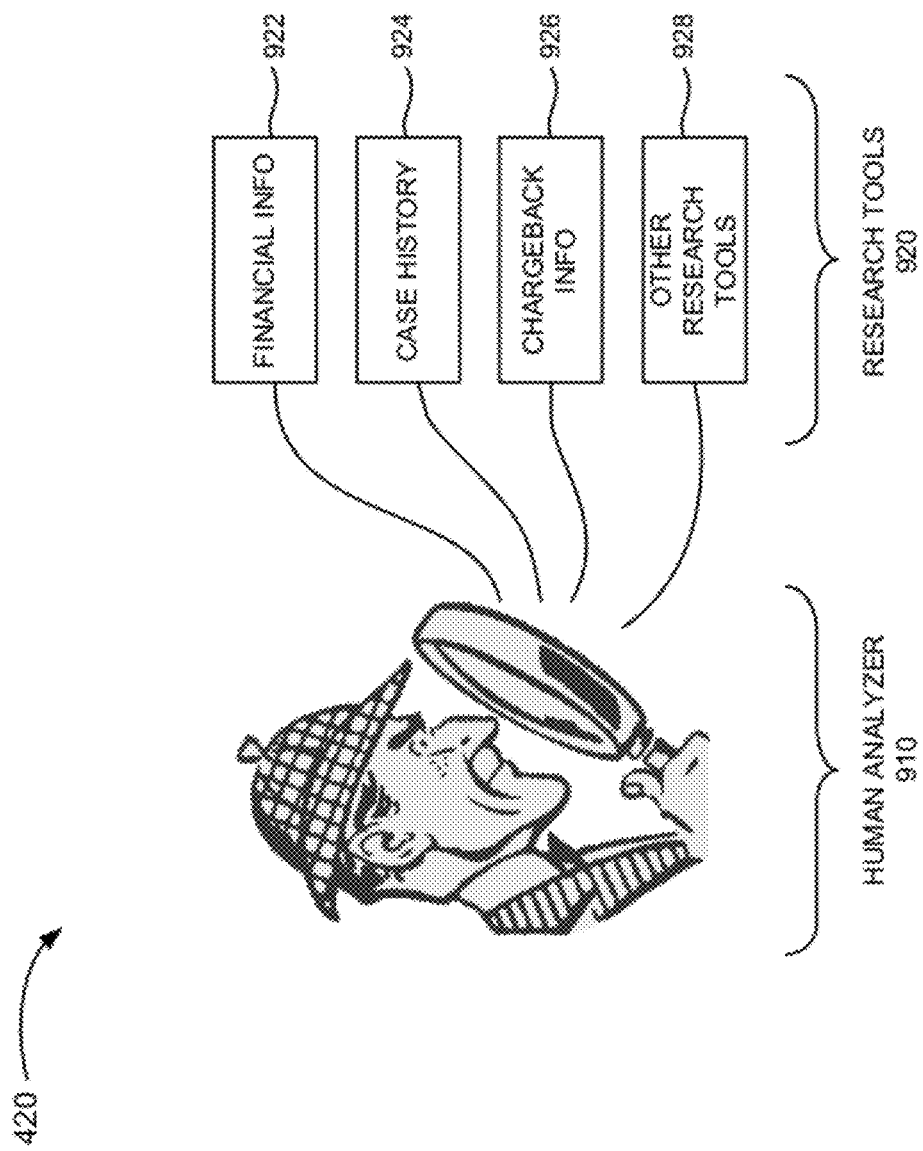
FIG. 9 is a diagram of example functional components of the fraud operations unit of FIG. 4.

FIG. 9 is a diagram of example functional components of fraud operations unit 420. In one implementation, the functions described in connection with FIG. 9 may be performed by one or more components of device 300 (FIG. 3) or one or more devices 300, unless described as being performed by a human. As shown in FIG. 9, fraud operations unit 420 may include a human analyzer 910 and a set of research tools 920. In another implementation, fraud operations unit 420 may include fewer, additional, or different functional components.

Human analyzer 910 may include a person, or a set of people, trained to research and detect fraudulent transactions. Human analyzer 910 may analyze for review transactions (e.g., transactions included in consolidated cases) and perform research to determine whether the transactions are fraudulent. Additionally, or alternatively, human analyzer 910 may perform trending analysis, perform feedback analysis, modify existing rules, and/or create new rules. Human analyzer 910 may record the results of transaction analysis and may present the results to fraud detection unit 410 and/or one or more merchant devices 220. Human analyzer 910 may cause modified rules and/or new rules to be stored in appropriate libraries 610.

Research tools 920 may include financial information 922, case history 924, chargeback information 926, and other research tools 928. Financial information 922 may include financial data and tools. Case history 924 may include a repository of previously analyzed cases. In one implementation, case history 924 may store a repository of cases for some period of time, such as six months, a year, two years, five years, etc. Chargeback information 926 may include information regarding requests for reimbursements (commonly referred to as "chargebacks") from a financial institution when the financial institution identifies a fraudulent transaction. When the financial institution identifies a fraudulent transaction, the financial institution may contact the merchant that was involved in the transaction and indicate, to the merchant, that the merchant's account is going to be debited for the amount of the transaction and perhaps have to pay a penalty fee. Other research tools 928 may include reverse telephone number look up tools, address look up tools, white pages tools, Internet research tools, etc. which may facilitate the determination of whether a transaction is fraudulent.

Figure 10:
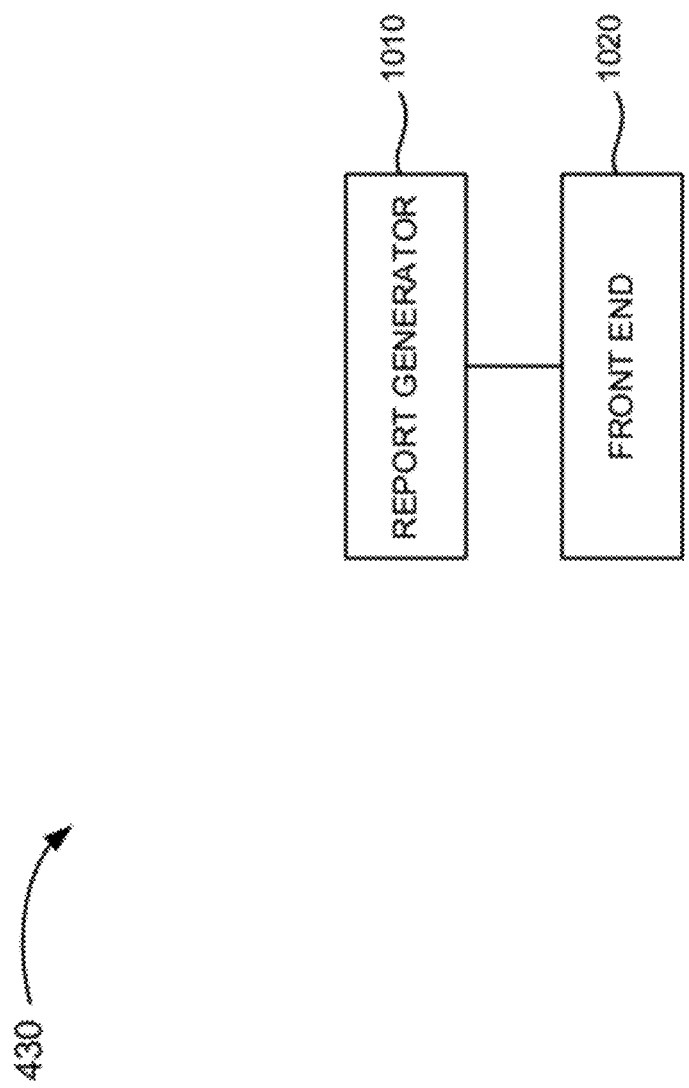
FIG. 10 is a diagram of example functional components of the portal unit of FIG. 4.

FIG. 10 is a diagram of example functional components of portal unit 430. In one implementation, the functions described in connection with FIG. 10 may be performed by one or more components of device 300 (FIG. 3) or one or more devices 300. As shown in FIG. 10, portal unit 430 may include a report generator component 1010 and a front end component 1020. In another implementation, portal unit 430 may include fewer functional components, additional functional components, different functional components, or differently arranged functional components.

Report generator component 1010 may generate reports for merchants. For example, a merchant may request (e.g., via front end component 1020) a particular report relating to transactions that the merchant sent to fraud management system 230. The report may provide information regarding the analysis of various transactions and may be tailored, by the merchant, to include information that the merchant desires. Report generator component 1010 may be configured to generate reports periodically, only when prompted, or at any other interval specified by a merchant. Report generator component 1010 may automatically send reports to merchants or may make the reports available to the merchants via front end component 1020.

In one implementation, report generator component 1010 may segregate information prior to generating a report. As explained above, a case may include information regarding transactions of multiple, unaffiliated merchants. For business reasons, when generating a report for a particular merchant, report generator component 1010 may remove information regarding transactions from other merchants ("other transactions"), including, for example, the influence that the other transactions had in generating fraud scores and in triggering particular rules. Report generator component 1010 may adjust scores (alarm, case, and/or fraud scores) to remove the effects from the other transactions.

Front end component 1020 may present a user interface accessible to merchants. Via front end component 1020, merchants may request reports, access previously-generated reports, interact with a human analyzer, or interact with fraud detection unit 410 and/or fraud operations unit 420 in another manner. In one implementation, front end component 1020 may automatically send generated reports to merchants (e.g., via email, facsimile, etc.) or may store generated reports in a memory to await retrieval by the merchants.

Figure 11:
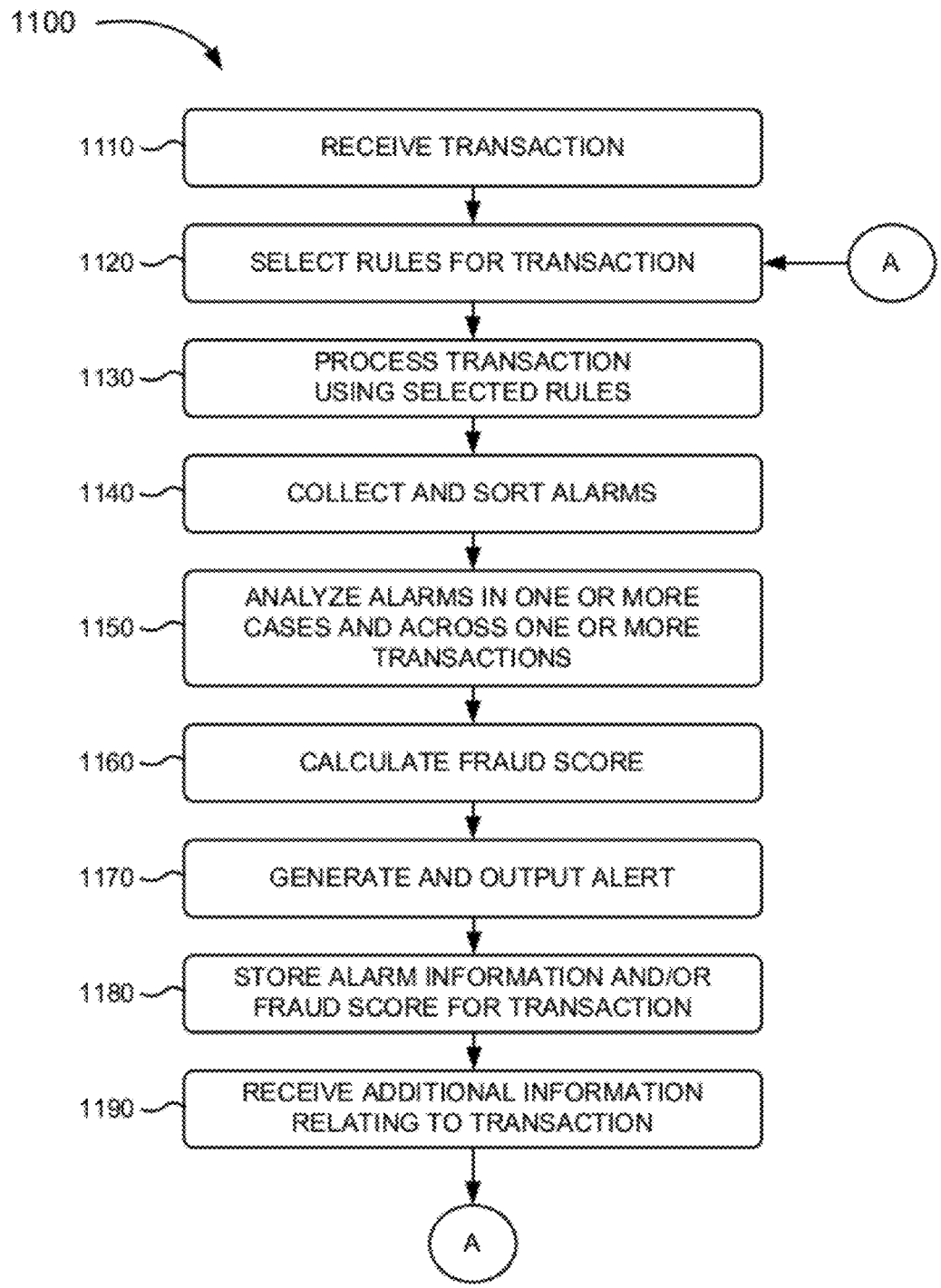
FIG. 11 is a flowchart of an example process for analyzing instances of fraud.

FIG. 11 is a flowchart of an example process 1100 for analyzing instances of fraud. In one implementation, process 1100 may be performed by one or more components/devices of fraud management system 230. In another implementation, one or more blocks of process 1100 may be performed by one or more other components/devices, or a group of components/devices including or excluding fraud management system 230.

Process 1100 may include receiving a transaction (block 1110). For example, fraud detector component 540 may receive a transaction from a merchant device 220. Merchant device 220 may use secure communications, such as encryption or a VPN, to send the transaction to fraud management system 230. In one implementation, merchant device 220 may send the transaction to fraud management system 230 in near real time (e.g., when a consumer submits money to the merchant for the transaction) and perhaps prior to the money being accepted by the merchant. In another implementation, merchant device 220 may send the transaction to fraud management system 230 after the money, for the transaction, has been accepted by the merchant (e.g., after the money has been accepted but prior to a product or service, associated with the transaction, being fulfilled, or possibly after the money has been accepted and after the product or service, associated with the transaction, has been fulfilled). In practice, fraud management system 230 may simultaneously receive information regarding multiple transactions from one or more merchant devices 220.

Rules may be selected for the transaction (block 1120). For example, fraud detector component 540 may generate a profile for the transaction based on transaction attributes (e.g., information in the transaction itself, meta information associated with the transaction, third party information associated with the transaction, and/or historical information associated with one or more attributes of the transaction). Fraud detector component 540 may use the profile and relevant information in a black or white list (if any information, relevant to the transaction, exists in a black or white list) to select a set of libraries 610 and/or a set of rules within one or more libraries 610 in the selected set of libraries 610. For example, fraud detector component 540 may select libraries 610 having single transaction rules, multi-transaction rules, merchant-specific rules, industry-specific rules, consumer-specific rules, or the like, based on information in the profile and/or information (if any) in a black or white list. As described above, some rules may be selected for every transaction.

The transaction may be processed using the selected rules (block 1130). For example, fraud detector component 540 may provide the transaction to rule engines 620 corresponding to the selected set of libraries 610 for processing. In one implementation, fraud detector component 540 may provide the transaction for processing by multiple rule engines 620 in parallel. The transaction may also be processed using two or more of the rules, in the selected set of rules of a library 610, in parallel. By processing the transaction using select rules, the accuracy of the results may be improved over processing the transaction using all of the rules (including rules that are irrelevant to the transaction). When a rule triggers (is satisfied), an alarm may be generated. The output of processing the transaction using the selected rules may include zero or more alarms.

The alarms may be collected and sorted (block 1140). For example, fraud detector component 540 may aggregate the alarms and may analyze attributes of the transactions with which the alarms are associated (e.g., attributes relating to a particular form of payment, a particular geographic area, a particular consumer, etc.). Fraud detector component 540 may correlate the alarms, along with alarms of other transactions (past or present associated with the same or different (unaffiliated) merchants), into cases based on values of the attributes of the transactions associated with alarms. For example, fraud detector component 540 may include one or more alarms associated with a particular credit card number in a first case, one or more alarms associated with a particular travel destination in a second case, one or more alarms associated with a particular country in a third case, etc. As described above, a particular alarm may be included in multiple cases.

The alarms, in one or more cases, may be analyzed across one or more transactions (block 1150). For example, fraud detector component 540 may analyze the alarms in a case (where the alarms may be associated with multiple transactions possibly from multiple, unaffiliated merchants and/or possibly from multiple, different industries) to determine whether the alarms justify a determination that the transaction is potentially fraudulent. By analyzing alarms in multiple cases, fraud detector component 540 may get a good picture of whether fraudulent activity is occurring.

A fraud score may be generated (block 1160). For example, fraud detector component 540 may generate a case score for each of the cases using a technique, such as a technique described previously. Fraud detector component 540 may combine the case scores, associated with the transaction, to generate a fraud score for the transaction. In one implementation, as described above, the case scores, associated with the different cases, may be weighted differently. For example, the fraud score of case 1 may have an associated weight of CW1, the fraud score of case 2 may have an associated weight of CW2, the fraud score of case 3 may have an associated weight of CW3, etc. Thus, in this implementation, the different case scores may not contribute equally to the fraud score. The fraud score may reflect a probability that the transaction is fraudulent.

In one implementation, the fraud score may include a value in the range of 0 to 100, where "0" may reflect a 0% probability that the transaction is fraudulent and "100" may reflect a 100% probability that the transaction is fraudulent. It may be possible for the case score of a particularly important case (with a high weight value) to drive the fraud score to 100 (even without any contribution from any other cases).

An alert may be generated (block 1170). For example, fraud detector component 540 may generate an alert based on the fraud score and policies associated with the merchant. For example, the merchant may specify policies that indicate what fraud scores constitute a safe transaction, what fraud scores constitute an unsafe transaction, and what fraud scores constitute a for review transaction. Fraud detector component 540 may generate an alert that indicates, to the merchant, that the transaction should be permitted or that the transaction should be denied.

Fraud detector component 540 may send the alert and/or the fraud score to the merchant so that the merchant can process the transaction accordingly. In one implementation, fraud detector component 540 may send the alert and/or fraud score while the merchant is still processing the transaction (e.g., before the merchant has approved the transaction). In another implementation, fraud detector component 540 may send the alert and/or fraud score after the merchant has completed processing the transaction (e.g., after the merchant has approved the transaction). In the latter implementation, when the transaction is determined to be potentially fraudulent, the merchant may take measures to minimize its loss (e.g., by canceling the airline tickets, by canceling shipping of the ordered product, by canceling performance of the ordered service, by canceling the payment of a medical claim, etc.).

Alarm information and/or the fraud score, for the transaction, may be stored (block 1180). For example, fraud detector component 540 may store the alarms that were generated for the transaction and/or the alarm scores associated with those alarms. Additionally, or alternatively, fraud detector component 540 may store the fraud score that was calculated for the transaction.

Additional information, relating to the transaction, may be received (block 1190). For example, at some later point in time after calculating the fraud score for the transaction, fraud detector component 540 may receive additional information that is relevant to the transaction (e.g., information relating to an attribute of the transaction). The additional information may include, for example, information regarding another transaction from this consumer, information regarding a transaction from another consumer, information regarding another transaction from the merchant, information regarding a transaction from another merchant that is affiliated with the merchant, information regarding a transaction from another merchant that is unaffiliated with the merchant, information regarding a transaction from another merchant that is associated with the same industry as the merchant, information regarding a transaction from another merchant that is associated with a different industry than the merchant, user behavior data associated with the consumer with regard to the merchant's website, user behavior data associated with the consumer with regard to another merchant's website, information regarding a human analyst's analysis of the transaction or other transactions from the consumer, and/or other information that might be useful in determining whether the transaction is fraudulent.

Rules may be selected again for the transaction (block 1120). For example, fraud detector component 540 may generate a profile for the transaction based on transaction attributes (e.g., information in the transaction itself, meta information associated with the transaction, third party information associated with the transaction, and/or historical information associated with one or more attributes of the transaction). In this case, the transaction attributes may include the additional information that was received and that relates to the previously-processed transaction.

As explained above, fraud detector component 540 may use the profile and relevant information in a black or white list (if any information, relevant to the transaction, exists in a black or white list) to select a set of libraries 610 and/or a set of rules within one or more libraries 610 in the selected set of libraries 610.

The transaction may be processed using the selected rules (block 1130). For example, fraud detector component 540 may provide the transaction to rule engines 620 corresponding to the selected set of libraries 610 for processing, as described above. The output of processing the transaction using the selected rules may include zero or more alarms.

The alarms may be collected and sorted (block 1140). For example, fraud detector component 540 may aggregate the alarms and may analyze attributes of the transactions with which the alarms are associated (e.g., attributes relating to a particular form of payment, a particular geographic area, a particular consumer, etc.). Fraud detector component 540 may correlate the alarms, along with alarms of other transactions (past or present associated with the same or different (unaffiliated) merchants), into cases based on values of the attributes of the transactions associated with alarms.

The alarms, in one or more cases, may be analyzed across one or more transactions (block 1150). For example, fraud detector component 540 may analyze the alarms in a case to determine whether the alarms justify a determination that the transaction is potentially fraudulent. By analyzing alarms in multiple cases, fraud detector component 540 may get a good picture of whether fraudulent activity is occurring.

A fraud score may be generated (block 1160). For example, fraud detector component 540 may generate a case score for each of the cases using a technique, such as a technique described previously. Fraud detector component 540 may combine the case scores, associated with the transaction, to generate a fraud score for the transaction.

An alert may be generated (block 1170). For example, as explained above, fraud detector component 540 may generate an alert based on the fraud score and policies associated with the merchant. In this case, fraud detector component 540 may determine whether the fraud score and/or the alert differs from the fraud score and/or alert that was previously generated. If the fraud score and/or the alert differs, fraud detector component 540 may send the alert and/or the fraud score to the merchant so that the merchant can process the transaction accordingly. For example, if the alert and/or fraud score indicates that the transaction, which was previously identified as not fraudulent, is now determined to be potentially fraudulent, the merchant may take measures to minimize its loss (e.g., by canceling the airline tickets, by canceling shipping of the ordered product, by canceling performance of the ordered service, by canceling the payment of a medical claim, etc.).

Blocks 1120-1190, of process 1100, may be repeated one or more times. Each iteration of blocks 1120-1190 may be based on additionally received information and, thus, improve the calculation of the fraud score.

Figure 12:
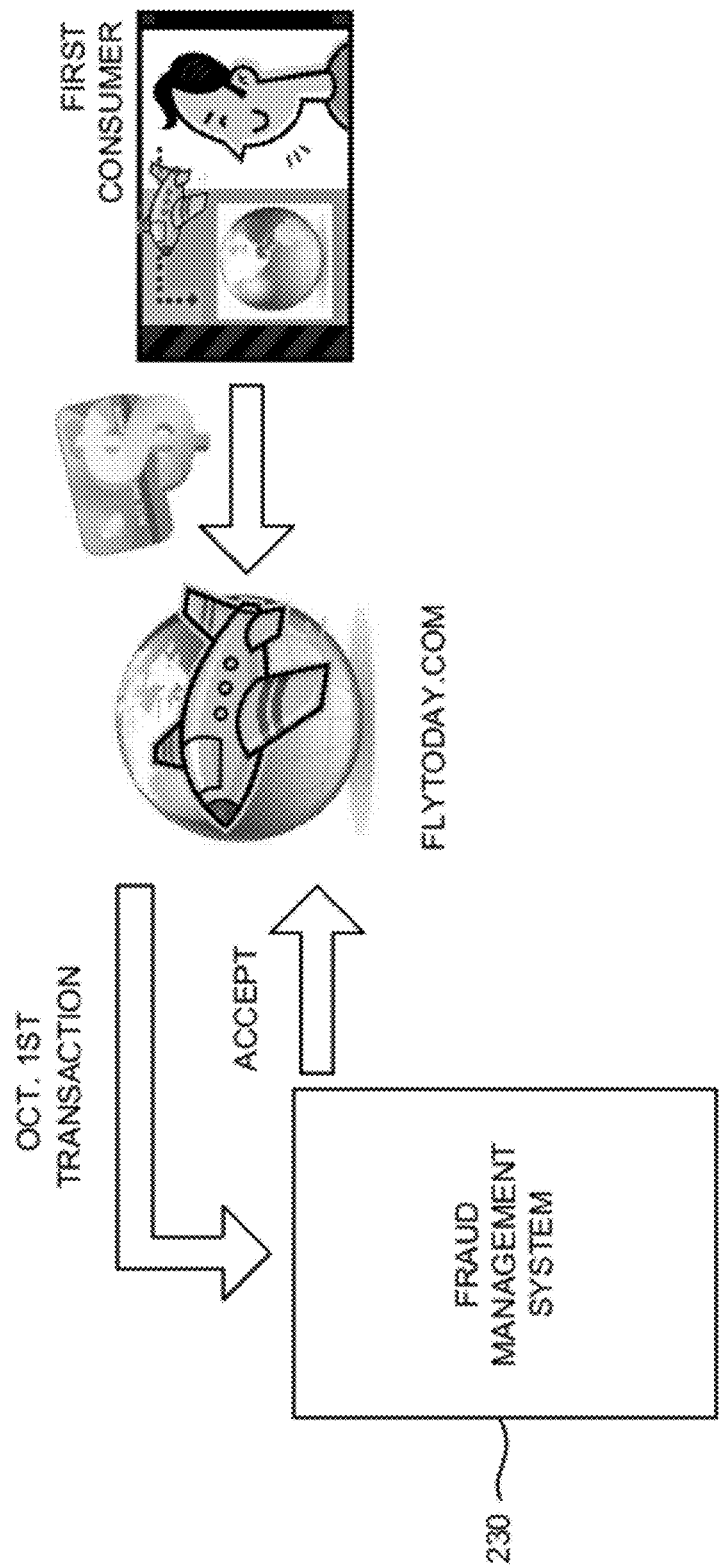
FIGS. 12-14 are diagrams illustrating an example for identifying a fraudulent transaction.
Figure 13:
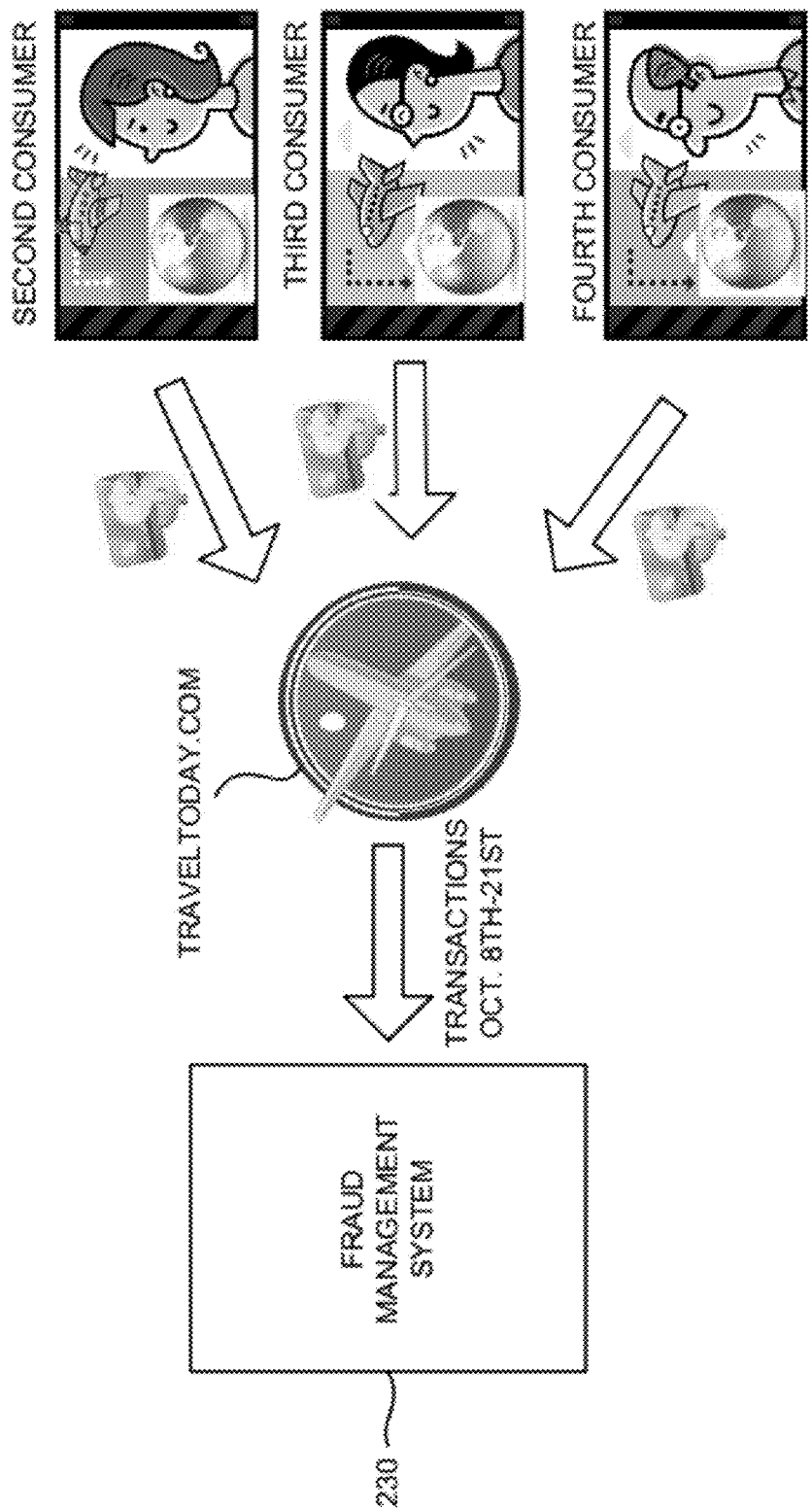
Figure 14:
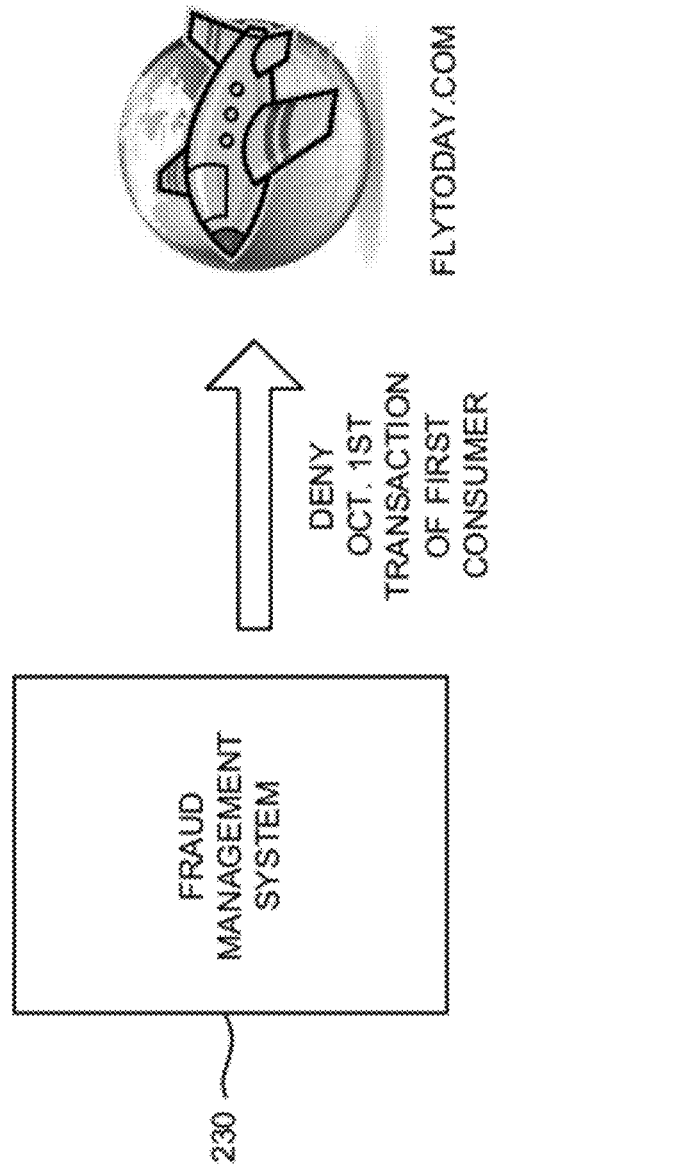

FIGS. 12-14 are diagrams illustrating an example for identifying a fraudulent transaction. As shown in FIG. 12, assume that a first consumer uses a particular credit card on a merchant's website (shown as FlyToday.com in FIG. 12) to purchase a trip. For example, assume that, on October 1st, the first consumer purchases a trip that leaves Phoenix on November 1st for Mexico City and returns to Phoenix on November 10th.

The transaction, associated with this trip, may be processed by fraud management system 230. For example, fraud management system 230 may receive the transaction associated with the first consumer, select rules for the transaction, such as travel industry rules, FlyToday.com-specific rules, credit card rules, IP address rules, Mexico City rules, single transaction rules, multi-transaction rules, etc., and process the transaction, in parallel, using the selected rules. Assume that a set of the selected rules trigger and generate corresponding alarms. For example, a rule may generate an alarm because the travel is destined for the hot destination of Mexico City (a hot destination may refer to a destination known to be associated with fraudulent activity).

Fraud management system 230 may process the alarms, correlate the alarms into cases, and determine, for example, that the transaction is likely not fraudulent based on the information known to fraud management system 230 at the time of processing the October 1st transaction associated with the first consumer. Fraud management system 230 may notify the FlyToday.com merchant that the transaction is not fraudulent. In other words, based on the totality of information available to fraud management system 230 at the time of processing the transaction associated with the first consumer, fraud management system 230 may determine that the transaction is not fraudulent and may notify the FlyToday.com merchant to accept the transaction, as shown in FIG. 12.

As shown in FIG. 13, assume that second, third, and fourth consumers use credit cards to purchase trips on another merchant's website (shown as TravelToday.com in FIG. 13). For example, assume that, on October 8th, the second consumer purchases a trip, for the same traveler as the trip purchased by the first consumer, that leaves Las Vegas on November 8th for Rio de Janeiro and returns to Las Vegas on November 15th; that, on October 16th, the third consumer, using the same IP address as the first consumer, purchases a trip that leaves San Francisco on November 12th for Rio de Janeiro and returns to San Francisco on November 15th; and that, on October 21st, the fourth consumer, also using the same IP address as the first consumer, purchases a trip that leaves Miami on November 11th for Rio de Janeiro and returns to Miami on November 15th.

Fraud management system 230 may receive the transactions associated with the second, third, and fourth consumers, select rules for the transactions, such as travel industry rules, TravelToday.com-specific rules, credit card rules, IP address rules, Rio de Janeiro rules, Miami rules, single transaction rules, multi-transaction rules, etc., and process the transactions, in parallel, using the selected rules. Assume that, for each of the transactions, a set of the selected rules trigger and generate corresponding alarms. For example, one rule may generate an alarm because the travel is destined for the hot destination of Rio de Janeiro; another rule may generate an alarm because the travel originated in the hot location of Miami; another rule may generate an alarm because there is overlapping travel (e.g., the travel itineraries overlap—one leaves on November 1st and returns on November 10th, and the other leaves on November 8th and returns on November 15th); and another rule may generate an alarm because the travel from the first, third, and fourth consumers originate from the same IP address.

Fraud management system 230 may process the alarms, correlate the alarms into cases, and determine, for example, that one or more of the transactions, from the second, third, and fourth consumers, is potentially fraudulent based on the information known to fraud management system 230 at the time of processing the transactions associated with the second, third, and fourth consumers. In other words, based on the totality of information available to fraud management system 230 at the time of processing the transactions associated with the second, third, an fourth consumers, fraud management system 230 may determine that one or more of the transactions is potentially fraudulent and may notify the TravelToday.com merchant to deny, or not fulfill, the transaction(s).

Based on the transactions from the second, third, and fourth consumers, among other things, fraud management system 230 may determine that the transaction from the first consumer should be re-processed. For example, fraud management system 230 may determine that the transactions, from the second, third, and fourth consumers, share at least one attribute with the transaction from the first consumer. As a result, fraud management system 230 may re-process the transaction from the first consumer.

Assume that when fraud management system 230 re-processes the transaction, fraud management system 230 determines that the transaction is potentially fraudulent. For example, fraud management system 230 may determine that the overlapping travel (e.g., the first and second consumers purchase trips for the same traveler, where one of the trips leaves Phoenix on November 1st for Mexico City and returns to Phoenix on November 10th, and the other one of the trips leaves Las Vegas on November 8th for Rio de Janeiro and returns to Las Vegas on November 15th); the multiple purchases of travel to the hot destination of Rio de Janeiro (e.g., the second, third, and fourth consumers purchase travel to Rio de Janeiro); the multiple purchases of travel from the same IP address (e.g., the first, third, and fourth consumers purchase travel from the same IP address); etc. contribute to a determination that the transaction, associated with the first consumer, is potentially fraudulent. In other words, based on the totality of information available to fraud management system 230 at the time of re-processing the transaction associated with the first consumer, fraud management system 230 may determine that the transaction is potentially fraudulent and may notify the FlyToday.com merchant to deny, or not fulfill, the transaction, as shown in FIG. 14. As a result, the FlyToday.com merchant may take measures to minimize its loss, such as canceling the tickets purchased by the first consumer (provided that the travel had not already occurred).

An implementation, described herein, may determine potentially fraudulent transactions by re-processing transactions when additional information, relating to one or more attributes associated with the transactions, becomes available. As described above, the transactions and the additional information may be associated with a single merchant, multiple, unaffiliated merchants associated with a particular industry, or multiple, unaffiliated merchants associated with multiple, different industries. By processing the transactions in such a manner, better fraud detection results may be obtained over prior, existing fraud detection systems.

The foregoing description provides illustration and description, but is not intended to be exhaustive or to limit the invention to the precise form disclosed. Modifications and variations are possible in light of the above disclosure or may be acquired from practice of the invention.

For example, while a series of blocks has been described with regard to FIG. 11, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   storing, by one or more computer devices of a fraud management system, a plurality of rules related to fraud detection;
   receiving, by the one or more computer devices, transaction data related to a transaction associated with a merchant;
   processing, by the one or more computer devices, the transaction data using select rules, of the plurality of rules, to generate a fraud score corresponding to a non-fraudulent determination with respect to the transaction;
   outputting, by the one or more computer devices, information regarding the fraud score to the merchant to assist the merchant in determining whether to proceed toward completion of the transaction;
   receiving, by the one or more computer devices and after outputting the information regarding the fraud score to the merchant, additional information relating to the transaction;
   determining, by the one or more computer devices, whether the additional information and the transaction share at least one attribute;
   re-processing the transaction data, by the one or more computer devices and in response to determining that the additional information and the transaction share the at least one attribute, including:
      selecting rules, as selected rules, from the plurality of rules based on information associated with the transaction data, wherein the information associated with the transaction data includes the additional information,
      re-processing different attributes of the transaction data, in parallel, using the selected rules to generate a plurality of alarms,
      sorting the plurality of alarms into a plurality of groups based on the different attributes of the transaction data, and
      analyzing the plurality of groups to generate an updated fraud score, wherein the sorting includes:
         aggregating alarms corresponding to transactions associated with a plurality of unaffiliated merchants associated with a plurality of different industries, wherein the plurality of unaffiliated merchants includes the merchant, and the alarms include the plurality of alarms, and
         correlating the alarms into the plurality of groups;
   determining whether information regarding the updated fraud score differs from the information regarding the fraud score with respect to the non-fraudulent determination; and
   outputting, by the one or more computer devices and in response to determining that the information regarding the updated fraud score differs from the information regarding the fraud score with respect to the non-fraudulent determination, the information regarding the updated fraud score to the merchant to assist the merchant in redetermining whether to terminate the transaction.

2. The method of claim 1, further comprising:
   generating a profile associated with the transaction based on at least one of information included in the transaction data, meta information associated with the transaction, third party information associated with the transaction, or historical information associated with the transaction; and wherein the reprocessing further comprises:
   selecting the rules, from the plurality of rules, based on information in the profile.

3. The method of claim 2, further comprising:
   generating a new profile associated with the transaction based on at least one of the additional information and the information included in the transaction data, the meta information associated with the transaction, the third party information associated with the transaction, or the historical information associated with the transaction; and
   selecting rules, from the plurality of rules, for re-processing the transaction data based on information in the new profile.

4. The method of claim 1, where outputting information regarding the fraud score includes:
   determining policies associated with the merchant,
   generating a first alert, associated with the transaction, based on the fraud score and the policies, where the first alert indicates that the merchant should accept, deny, or fulfill the transaction, and
   outputting the first alert to the merchant.

5. The method of claim 4, where outputting information regarding the updated fraud score includes:
   determining the policies associated with the merchant,
   generating a second alert, associated with the transaction, based on the updated fraud score and the policies, where the second alert indicates that the merchant should accept, deny, or fulfill the transaction,
   determining whether the second alert is different from the first alert, and
   outputting the second alert to the merchant when the second alert differs from the first alert.

6. The method of claim 1, wherein processing the transaction data includes:
processing different attributes of the transaction data, in parallel, using the select rules to generate a plurality of alarms,
sorting the plurality of alarms into a plurality of groups based on the different attributes of the transaction data, wherein each of one or more of the plurality of groups includes alarms from a plurality of transactions, and
analyzing the plurality of groups to generate the fraud score.

7. The method of claim 1, further comprising:
generating the plurality of rules using a heuristic-based technique or a pattern recognition technique.

8. The method of claim 1, further comprising:
analyzing the fraud score and the updated fraud score with respect to first and second thresholds, wherein the first threshold is less than the second threshold;
classifying the transaction as a non-fraudulent transaction when the fraud score is less than the first threshold; and
re-classifying the transaction as a potentially fraudulent transaction when the updated fraud score is greater than the second threshold; and
wherein outputting information regarding the fraud score or the information regarding the updated fraud score includes:
outputting, to the merchant, information that the transaction has been classified as the non-fraudulent transaction or the potentially fraudulent transaction.

9. A system, comprising:
one or more memory devices to store a plurality of rules related to fraud detection; and
one or more processors configured to:
receive transaction data related to a transaction involving a consumer and a merchant;
process the transaction data using a first subset of rules, of the plurality of rules, to generate a first plurality of alarms, wherein, when processing the transaction data using the first subset of rules, the one or more processors are to:
process the transaction data, in parallel, using the first subset of rules to generate the first plurality of alarms, and
generate an alarm score for each alarm of the first plurality of alarms; and
wherein, when processing the first plurality of alarms to generate the fraud score, the one or more processors are to:
sort the first plurality of alarms into a plurality of groups based on attributes of the transaction, wherein each of the plurality of groups includes at least one alarm from the first plurality of alarms, and one or more of the plurality of groups include alarms corresponding to a plurality of transactions associated with a plurality of unaffiliated merchants, wherein the merchant is one of the plurality of unaffiliated merchants,
generate a group score for each group, of the plurality of groups, based on the alarm score for the at least one alarm in the group, and
generate a fraud score based on one or more of the groups;
wherein the fraud score corresponds to a non-fraudulent determination with respect to the transaction;
output information regarding the fraud score to the merchant to assist the merchant in determining whether to proceed with the transaction;
receive, after the determining by the merchant, additional information relating to the transaction;
re-process the transaction using a second subset of rules, of the plurality of rules, to generate a second plurality of alarms;
process the second plurality of alarms to generate an updated fraud score; and
output information regarding the updated fraud score to the merchant to assist the merchant in re-determining whether to terminate the transaction.

10. The system of claim 9, where the additional information relates to an attribute of the transaction, where the attribute includes at least one of:
information regarding another transaction associated with the consumer,
information regarding a particular transaction from another consumer that is different from the consumer,
information regarding another transaction associated with the merchant,
information regarding a particular transaction from another merchant that is unaffiliated with the merchant,
information regarding a particular transaction from another merchant that is associated with a different industry than the merchant,
user behavior data associated with the consumer with regard to a website of the merchant,
user behavior data associated with the consumer with regard to a website of another merchant, or
information regarding a human analyst's analysis of the transaction or another transaction from the consumer.

11. The system of claim 9, wherein the one or more processors are further configured to:
flag the transaction for review by a human analyzer based on the updated fraud score.

12. The system of claim 9, wherein, when outputting information regarding the updated fraud score, the one or more processors are to:
determine whether the information regarding the updated fraud score corresponds to a first classification of fraud potential that differs from a second classification of fraud potential corresponding to the information regarding the fraud score, and
output the information regarding the updated fraud score to the merchant only when the first classification of fraud potential differs from the second classification of fraud potential.

13. The system of claim 9, wherein the one or more processors are further to:
generate a profile associated with the transaction based on information included in the transaction data, meta information associated with the transaction, third party information associated with the transaction, or historical information associated with the transaction; and
select rules, for the first subset of rules, based on information in the profile.

14. The system of claim 13, wherein the one or more processors are further to:
generate a new profile associated with the transaction based on the additional information and the information included in the transaction data, the meta information associated with the transaction, the third party information associated with the transaction, or the historical information associated with the transaction; and
select rules, for the second subset of rules, based on information in the new profile.

15. The system of claim 9, wherein, when outputting information regarding the fraud score, the one or more processors are to:
- determine policies associated with the merchant,
- generate a first alert, associated with the transaction, based on the fraud score and the policies, wherein the first alert indicates that the merchant should accept or fulfill the transaction, and
- output the first alert to the merchant.

16. The system of claim 15, wherein, when outputting information regarding the updated fraud score, the one or more processors are to:
- determine the policies associated with the merchant,
- generate a second alert, associated with the transaction, based on the updated fraud score and the policies, where the second alert indicates that the merchant should deny the transaction,
- determine that the second alert is different from the first alert, and
- output the second alert to the merchant indicating that the second alert differs from the first alert.

17. A non-transitory computer-readable medium that stores instructions executable by one or more computer devices to perform fraud detection, comprising:
- storing a plurality of rules related to determining fraud potential;
- receiving transaction data, related to a transaction, from a merchant;
- processing the transaction using a first subset of rules, of the plurality of rules, to generate the fraud potential for the transaction, wherein the fraud potential corresponds to a non-fraudulent determination with respect to the transaction;
- outputting information regarding the fraud potential to the merchant to assist the merchant in determining whether to process the transaction;
- receiving, after outputting the information regarding the fraud potential to the merchant, additional information relating to the transaction;
- re-processing the transaction data using a second subset of rules, of the plurality of rules, including:
  - selecting rules, for the second subset of rules, based on information associated with the transaction data, wherein the information, associated with the transaction data, includes the additional information,
  - processing different attributes of the transaction data, in parallel, using the second subset of rules to generate a plurality of alarms,
  - sorting the plurality of alarms into a plurality of groups based on the different attributes of the transaction data, and
  - analyzing the plurality of groups to generate an updated fraud potential, wherein the sorting includes:
    - aggregating alarms corresponding to transactions associated with a plurality of unaffiliated merchants associated with a plurality of different industries, wherein the plurality of unaffiliated merchants includes the merchant, and the alarms include the plurality of alarms, and
    - correlating the alarms into the plurality of groups; and
- outputting, in response to determining that the information regarding the updated fraud potential differs from the information regarding the fraud potential with respect to the non-fraudulent determination, the information regarding the updated fraud potential to the merchant to assist the merchant in determining whether to take remedial action with respect to the determining to terminate the transaction.

18. The non-transitory computer-readable medium of claim 17, wherein processing the transaction data includes:
- processing different attributes of the transaction data, in parallel, using the first subset of rules to generate a plurality of alarms,
- sorting the plurality of alarms into a plurality of groups based on the different attributes of the transaction data, wherein each of one or more of the plurality of groups includes alarms associated with a plurality of transactions, and
- analyzing the plurality of groups to generate the fraud potential.

* * * * *